(12) United States Patent
Watanabe et al.

(10) Patent No.: US 7,773,484 B2
(45) Date of Patent: Aug. 10, 2010

(54) OPTICAL DISC DEVICE AND CONTROL CIRCUIT FOR OPTICAL DISC DEVICE

(75) Inventors: Katsuya Watanabe, Nara (JP); Takaharu Ai, Osaka (JP)

(73) Assignee: Panasonic Corporation, Osaka (JP)

( * ) Notice: Subject to any disclaimer, the term of this patent is extended or adjusted under 35 U.S.C. 154(b) by 401 days.

(21) Appl. No.: 12/064,463

(22) PCT Filed: Aug. 24, 2006

(86) PCT No.: PCT/JP2006/316621

§ 371 (c)(1),
(2), (4) Date: Feb. 22, 2008

(87) PCT Pub. No.: WO2007/023905

PCT Pub. Date: Mar. 1, 2007

(65) Prior Publication Data

US 2009/0092026 A1 Apr. 9, 2009

(30) Foreign Application Priority Data

Aug. 25, 2005 (JP) ............................. 2005-243849

(51) Int. Cl.
*G11B 3/74* (2006.01)
(52) U.S. Cl. ...................... 369/94; 369/53.24
(58) Field of Classification Search ....................... None
See application file for complete search history.

(56) References Cited

U.S. PATENT DOCUMENTS 5,394,383 A 2/1995 Hira (Continued)

FOREIGN PATENT DOCUMENTS

JP 2743494 2/1991

(Continued)

OTHER PUBLICATIONS

International Search Report for corresponding Application No. PCT/JP2006/316621 dated Oct. 3, 2006.

(Continued)

*Primary Examiner*—Paul Huber
(74) *Attorney, Agent, or Firm*—Renner, Otto, Boisselle & Sklar, LLP

(57) ABSTRACT

To prevent the focal point of a light beam from entering an unrecorded area, where no data has been written yet, when data is being read continuously from multiple storage layers.

An optical disc drive can read data from an optical disc with at least first and second storage layers. The drive includes: a drive mechanism for rotating the disc; an optical pickup, which irradiates the disc in the drive mechanism with converged light and generates a read signal based on the light reflected from the disc; and a control section for controlling operations of the drive mechanism and the pickup, thereby shifting the focal point of the light. In reading data from the first and second layers continuously, the control section shifts the focal point in a first radial direction while data is read from the first layer and then moves the focal point to a location on the second layer before data starts to be read from the second layer. That location has been shifted from its previous one by a predetermined displacement in a second radial direction that is opposite to the first radial direction.

12 Claims, 17 Drawing Sheets

U.S. PATENT DOCUMENTS

| | | |
|---|---|---|
| 5,781,516 A | 7/1998 | Yamada |
| 6,330,212 B1 | 12/2001 | Iida |
| 2004/0001410 A1 | 1/2004 | Yonezawa |
| 2004/0076084 A1 | 4/2004 | Yonezawa |

FOREIGN PATENT DOCUMENTS

| | | |
|---|---|---|
| JP | 06-302131 | 10/1994 |
| JP | 11-296870 | 10/1999 |
| JP | 2000-048378 | 2/2000 |
| JP | 2000-251271 | 9/2000 |
| JP | 2004-063025 | 2/2004 |
| JP | 2005-149671 | 6/2005 |
| JP | 2005-332580 | 12/2005 |

OTHER PUBLICATIONS

Supplemental European Search Report for corresponding application No. 06796734 issued Mar. 11, 2009.

FIG.2
(a)
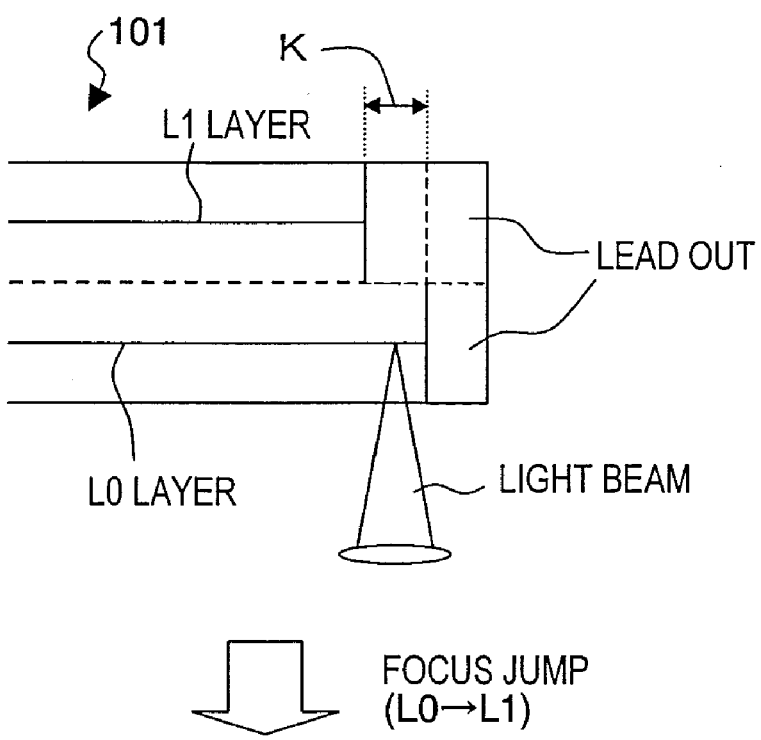
(b)
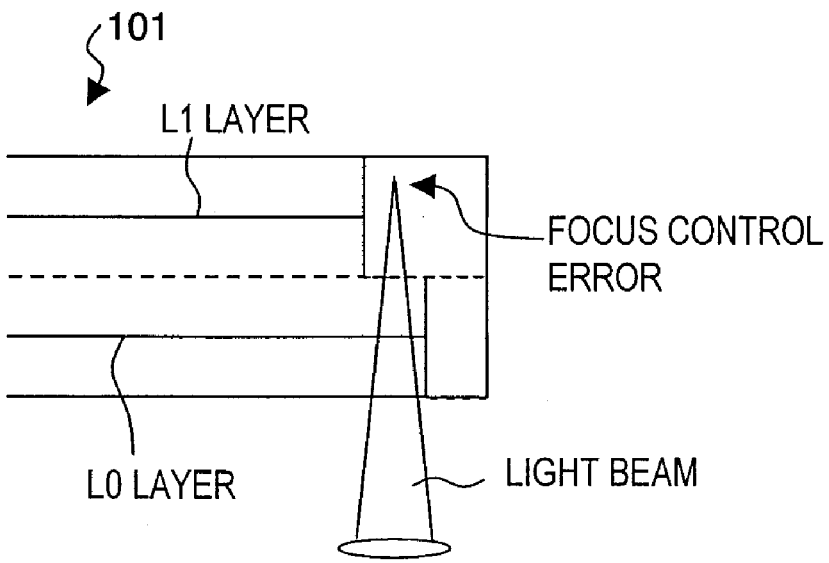

FIG.3
(a)
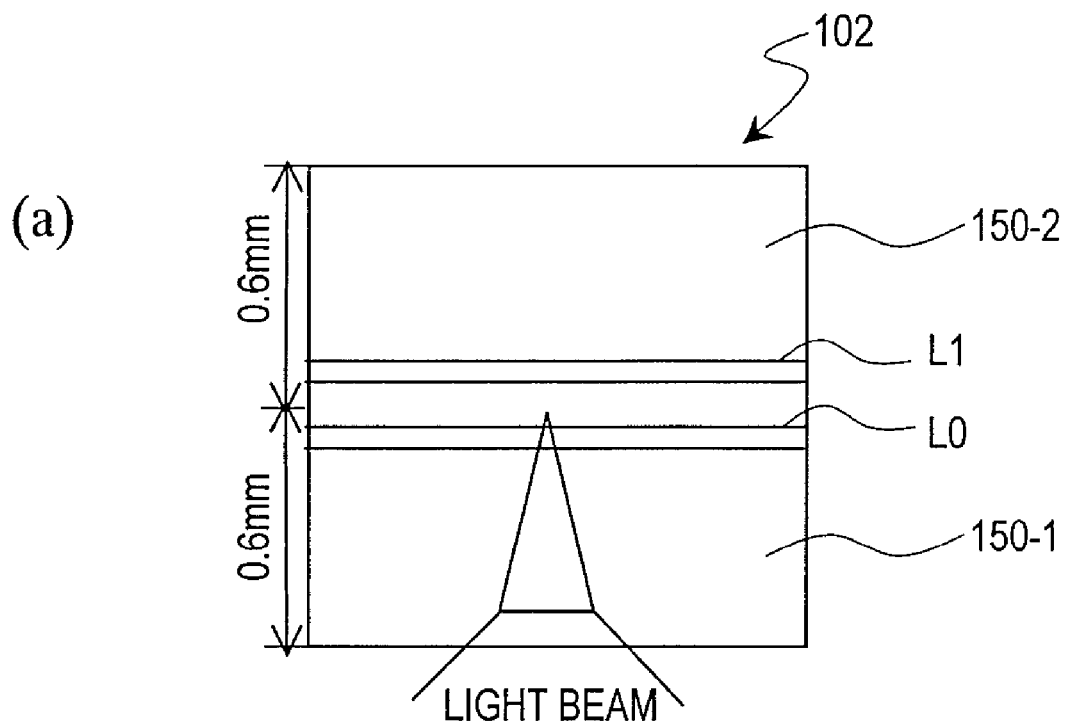
(b)
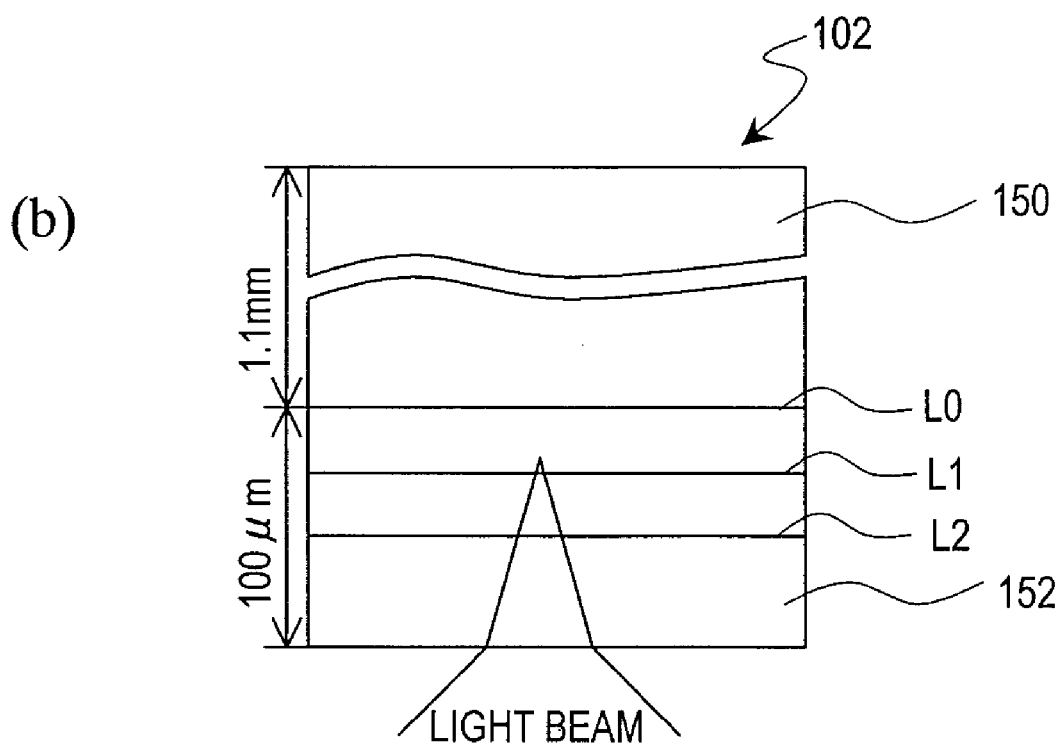

FIG.5
(a) 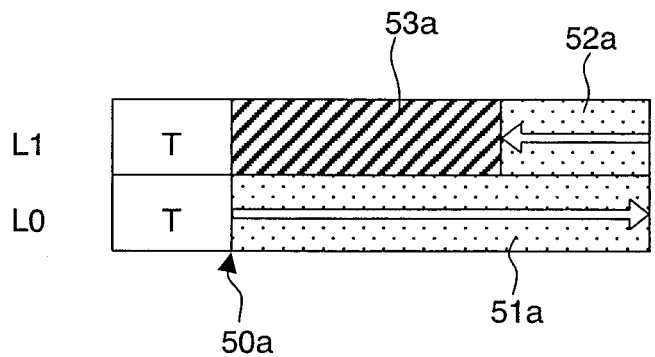
(b) 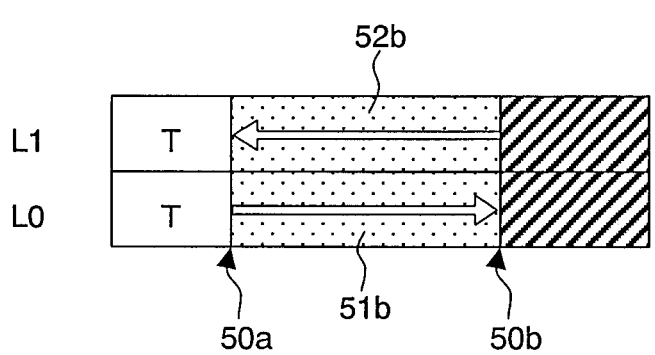
(c) 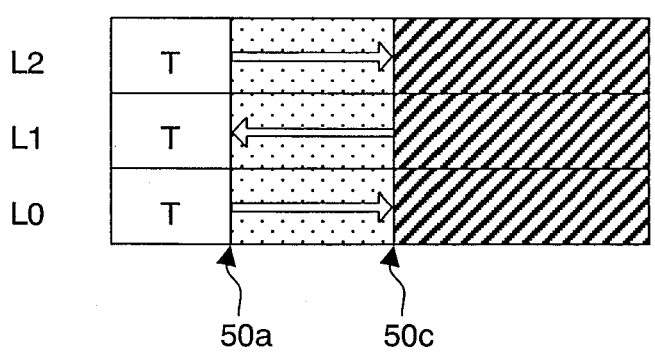

OPTICAL DISC DEVICE AND CONTROL CIRCUIT FOR OPTICAL DISC DEVICE

This application is a 371 of PCT/JP2006/316621, filed Aug. 24, 2006.

TECHNICAL FIELD

The present invention relates to an optical disc drive for reading data from a spinning disklike information storage medium (which will be referred to herein as an "optical disc"). More particularly, the present invention relates to an optical disc drive that can read data continuously from multiple adjacent storage layers of a multilayer disc with the focal point of a light beam jumped just as intended from one layer to another and with the data unrecorded area of the destination layer avoided.

BACKGROUND ART

Optical disc drives for reading and/or writing data from/on various types of optical discs such as DVDs (digital versatile discs) have been developed and used extensively nowadays. Recently, as more and more sorts of electronic information get stored on optical discs, the optical disc drives are increasingly required to operate with even higher reliability and come in even handier.

Data can be read out from a rotating optical disc by irradiating the disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc, a recording material film, from/on which data can be read and written optically, is deposited by an evaporation process, for example, on the surface of a base material on which tracks with spiral lands or grooves are arranged. In writing data on such a rewritable optical disc, data is written there by irradiating the optical disc with a light beam, of which the optical power has been changed according to the data to be written, and locally changing the property of the recording material film.

It should be noted that the depth of the pits, the depth of the tracks, and the thickness of the recording material film are all smaller than the thickness of the optical disc base material. For that reason, those portions of the optical disc, where data is stored, define a two-dimensional plane, which is sometimes called an "information storage plane". However, considering that such an "information storage plane" actually has a physical dimension in the depth direction, too, the term "storage plane" will be replaced herein by another term "storage layer". Every optical disc has at least one such storage layer. Optionally, a single storage layer may actually include a plurality of layers such as a phase-change material layer and a reflective layer.

To read data that is stored on a recordable optical disc or to write data on such an optical disc, the light beam always needs to maintain a predetermined converging state on a target track on a storage layer. For that purpose, a "focus control" and a "tracking control" are required. The "focus control" means controlling the position of an objective lens perpendicularly to the storage layer (which direction will be referred to herein as a "substrate depth direction") such that the focus position of the light beam is always located on the storage layer. On the other hand, the "tracking control" means controlling the position of the objective lens along the radius of a given optical disc (which direction will be referred to herein as a "disc radial direction") such that the light beam spot is always located right on a target track.

Read-only optical discs with multiple storage layers have been developed and have become more and more popular these days. Meanwhile, to meet demand for storing data of a huge size, recordable optical discs with multiple storage layers have also been proposed. Such an optical disc with multiple storage layers is called a "multilayer disc".

To sequentially read data that is stored over multiple storage layers, the operation of jumping the focal point of a light beam from one storage layer to another (which is a so-called "focus jump operation") needs to be performed. The focus jump can get done by performing a focus control and a tracking control in combination.

For example, Patent Document No. 1 discloses an optical disc drive that performs a focus jump operation. If the target address location is inside of the current address location, the optical disc drive once performs a seek operation until the radial location corresponding to the target address location is reached in the same storage layer, and then performs a focus jump operation to get to the target address location. On the other hand, if the target address location is outside of the current address location, the optical disc drive performs a focus jump operation from the current address location and then performs a seek operation to reach the target address location.

To read and write data from/on a multilayer disc just as intended, however, various influences should be taken into consideration.

In a multilayer disc, to make the reflectances of respective storage layers substantially constant, one of the storage layers to be irradiated with the light beam first should have a high transmittance, thus lowering the reflectance that should be constant. As a result, the optical disc is produced such that the reflectances of the respective storage layers are substantially equal to this low reflectance. Consequently, the signal levels and SNRs of various signals decrease.

Meanwhile, as for areas in each storage layer, the reflectance changes according to a property of the disc between an unrecorded area in which no data has been written yet and a recorded area in which data has already been written. The disc may have the following two types of properties—a property that the reflectance decreases by writing data thereon (as in a DVD-RAM, for example) or a property that the reflectance increases by writing data thereon. This variation in reflectance is normally as much as twice or more. In the vicinity of the boundary between the recorded and unrecorded areas, various types of signals are affected by this reflectance variation. If particularly precise servo is required, the influence of this variation could raise a serious disturbance.

A read-only device (i.e., a player) generates a phase difference tracking error signal (which will be referred to herein as a "phase difference TE signal") based on the light that has been reflected from a sequence of pits on an optical disc and performs a tracking control using this phase difference TE signal. On a read-only optical disc, data is always stored as pits. That is why as long as the focal point is on the track on the optical disc, the phase difference TE signal can be generated from any area and the tracking control can be performed using it. On top of that, since address information has been added to the data, the optical pickup can be positioned just as intended.

If such a player were loaded with a recordable optical disc with an unrecorded area, the tracking control could not be performed anymore. In the unrecorded area, there is no sequence of marks corresponding to a sequence of pits on a read-only optical disc. That is why if the focal point of a light beam entered the unrecorded area, no phase difference TE signal could be generated and the tracking control could not be performed just as intended.

On the other hand, a device compatible with a recordable optical disc (i.e., a recorder) needs to write data on the unrecorded area of an optical disc, and therefore, performs a tracking control by a push-pull method that involves the presence of a sequence of marks. To perform a tracking control by the push-pull method, a push-pull tracking error signal should be generated from a groove on an optical disc.

Patent Document No. 1: Japanese Patent Application Laid-Open Publication No. 2000-251271

DISCLOSURE OF INVENTION

Problems to be Solved by the Invention

However, according to the method of accessing the target address location from the current address location over the shortest distance such as that adopted by the optical disc drive of Patent Document No. 1, the focal point of the light beam could have to pass the unrecorded area of the destination storage layer. This is because as the access is done over the shortest distance, the destination of the focus jump operation may or may not be within the recorded area. In that case, it would be difficult to avoid an unwanted situation where the stability of the servo control is threatened by a difference in reflectance between the recorded and unrecorded areas.

Besides, the servo control could fail if the type of the given optical disc were recognized erroneously. For example, suppose a recorder has written continuous video or audio data over two storage layers of a recordable dual-layer DVD. Specifically, in this DVD, first, data is written on L0 layer, which is the layer closest to the surface irradiated with the light beam, outward (i.e., from an inner area on the L0 layer toward an outer area), and then writing is continued on L1 layer, which is located deeper than the L0 layer, in the opposite direction (i.e., from the outer area on the L1 layer toward an inner area). If such an optical disc is loaded into a conventional player, however, the player could recognize the optical disc as a read-only one and would try to access its recorded area by controlling the optical pickup.

Nevertheless, there is an unrecorded area in the vicinity of the outer edge of the L1 layer that is the destination of the focus jump operation. That is why if the dual-layer disc had low bonding accuracy or clamp accuracy or if the eccentricity error were significant, then the destination of the focus jump operation could be within the unrecorded area and the servo control could fail. Furthermore, if the focal point of the light beam could not stay within the unrecorded area but fell off the outer edge of the disc as a result of the focus jump operation, the servo control would fail, too. In that case, seamless playback could not be performed continuously from the L0 layer to the L1 layer and video and/or audio would be discontinued.

These various problems would also be encountered when a dedicated player for reading information from a two-, three- or four-layer disc with a big storage capacity is going to play such a multilayer disc on which the information has been written by a recorder using a next-generation blue laser diode.

Those problems are most noticeable when a recordable optical disc is inserted into a player. This is because a player never performs a tracking control by the push-pull method, by which tracking could be performed on a track in the unrecorded area.

If such a disc is subjected to finalize processing, the unrecorded area will change into a recorded area and a phase difference TE signal can be obtained. That is why to get a recordable optical disc played by a player with stability, the finalize processing must be performed.

However, if the finalize processing always had to be performed, it would take a lot of time to get that processing done and the unrecorded area would be wasted in vain, which is not beneficial at all. Among other things, a next-generation optical disc such as a Blu-ray disc has such a huge storage capacity that it might take as long as several tens of minutes to get the finalize processing done and a space of as much as several gigabytes could be wasted. For that reason, it is not appropriate to require the finalize processing.

What is more, even if the finalize processing were carried out, it would be still impossible to prevent the focal point from entering the lead-out area by mistake as a result of the focus jump operation.

Portions (a) through (c) of FIG. 1 show the manufacturing process steps of a multilayer disc. First, as shown in portion (a) of FIG. 1, two substrates 101-1 and 101-2, each having one storage layer, are provided and bonded together with an adhesive. Then, a multilayer disc 101, including storage layers L0 and L1 (which will be referred to herein as "L0 layer" and "L1 layer", respectively), is obtained as shown in portion (b) of FIG. 1.

If the bonding accuracy were low, then the magnitude of misalignment between the respective edges of the L0 and L1 layers (i.e., the bonding error K) would be significant. The bonding error K could be 50 µm, for example.

If the bonding error K were significant when the optical disc drive performs a focus jump operation to access a particular target location (track) on such an optical disc, then the focal point of the light beam could enter the unrecorded area thereof. For example, portion (a) of FIG. 2 shows a situation where the light beam is focused on the L0 layer of an optical disc 101 with the bonding error K. On the other hand, portion (b) of FIG. 2 shows a situation where the focal point of the light beam has entered the lead-out area of the L1 layer as a result of a focus jump operation.

To make things even worse, the stability of the servo control, which has already been endangered by going through the focus jump operation, could further decrease when affected by fluctuations in signal level in the unrecorded area or variations in reflected light around the boundary. Also, to spin the disc at high velocities, the disc should be clamped firmly onto the disc drive mechanism. However, a similar problem would arise if the clamping accuracy were low of if the disc had some eccentricity.

Furthermore, to read and write data from/on a recordable optical disc, the response time, i.e., the amount of time it takes to get a read/write operation actually started since a read/write request was received, should be as short as possible. Since the focus control adjustments of the light beam need to be made separately on a recorded area and on an unrecorded area, an access method that makes the focal point of the light pass only the recorded area is preferably adopted.

An object of the present invention is to prevent the focal point of a light beam from entering an unrecorded area, where no data has been written yet, when data is being read continuously from multiple storage layers. Another object of the present invention is to control the focus position of the light beam such that data can be read seamlessly and with stability even if the focal point of the light beam has entered the unrecorded area.

Means for Solving the Problems

An optical disc drive according to the present invention can read data from an optical disc that has a plurality of storage layers including a first storage layer and a second storage layer. The drive includes: a drive mechanism for rotating the optical disc; an optical pickup, which irradiates the optical disc, loaded in the drive mechanism, with converged light and generates a read signal based on the light that has been reflected from the optical disc; and a control section for controlling operations of the drive mechanism and the optical pickup, thereby shifting the focal point of the light. In reading continuously data that is stored over the first and second storage layers, the control section shifts the focal point of the light in a first radial direction while data is being read from the first storage layer and then moves the focal point of the light to a location on the second storage layer before data starts to be read from the second storage layer. The location on the second storage layer has been shifted from its previous location by a predetermined displacement in a second radial direction that is opposite to the first radial direction.

Before data starts to be read from the second storage layer, the control section may shift the focal point of the light on the first storage layer in the second radial direction by the predetermined displacement and then jump the focal point to the second storage layer.

Alternatively, before data starts to be read from the second storage layer, the control section may jump the focal point of the light from the first storage layer to the second storage layer while shifting the focal point in the second radial direction.

Still alternatively, before data starts to be read from the second storage layer, the control section may jump the focal point of the light from the first storage layer to the second storage layer and then shift the focal point in the second radial direction by the predetermined displacement.

The optical disc drive may further include a decision section for determining, based on the light that has been reflected from the optical disc, whether the focal point of the light is currently located in a recorded area where data is stored or in an unrecorded area where no data is stored. If the decision section determines that the focal point of the light that has been jumped from the first storage layer to the second storage layer is currently located in the unrecorded area, the control section may shift the focal point of the light in the second radial direction by the predetermined displacement.

The optical disc drive may further include an address detecting section for detecting addresses on respective tracks of the first and second storage layers based on the light that has been reflected from the optical disc. If the address detecting section is unable to detect the address after the focal point of the light has been jumped from the first storage layer to the second storage layer, the control section may shift the focal point of the light in the second radial direction by the predetermined displacement.

Respective spiral tracks on the first and second storage layers are wound in mutually opposite directions.

The optical disc drive may read the data from respective recorded areas of the first and second storage layers, to which continuous logical sector numbers have been given.

The optical disc drive may be a read-only device for reading the data that has been written by a recorder.

A controller according to the present invention is built in an optical disc drive, which includes a drive mechanism for rotating an optical disc and an optical pickup, which irradiates the optical disc, loaded in the drive mechanism, with converged light and generates a read signal based on the light that has been reflected from the optical disc. The drive can read data from the optical disc that has a plurality of storage layers including a first storage layer and a second storage layer. In reading continuously data that is stored over the first and second storage layers, the controller controls operations of the drive mechanism and the optical pickup and shifts the focal point of the light in a first radial direction while data is being read from the first storage layer and then moves the focal point of the light to a location on the second storage layer before data starts to be read from the second storage layer. The location on the second storage layer has been shifted from its previous location by a predetermined displacement in a second radial direction that is opposite to the first radial direction.

Before data starts to be read from the second storage layer, the controller may shift the focal point of the light on the first storage layer in the second radial direction by the predetermined displacement and then jump the focal point to the second storage layer.

Alternatively, before data starts to be read from the second storage layer, the controller may jump the focal point of the light from the first storage layer to the second storage layer while shifting the focal point in the second radial direction.

Effects of the Invention

In reading data continuously from first and second storage layers that are adjacent to each other in a multilayer disc, the optical disc drive of the present invention shifts the focal point of the light beam in a radial direction that is opposite to another radial direction in which the focal point of the light beam has been shifted in the first storage layer. The shift may be done either before the focal point is jumped to the second storage layer or while the focal point is being jumped to the second storage layer. Since the spiral tracks on two adjacent storage layers are wound in mutually opposite directions, this shift operation can prevent the focal point from entering an unrecorded area due to a bonding error, for example.

Also, if it is determined that the focal point is located in a data unrecorded area, then the focal point is shifted in the direction that is opposite to the radial direction in which the focal point of the light beam has been shifted in the first storage layer, thereby recovering a servo controllable state quickly. As a result, seamless playback can be done with good stability.

BRIEF DESCRIPTION OF DRAWINGS

Portions (a) through (c) of FIG. 1 show the manufacturing process steps of a multilayer disc.

Portion (a) of FIG. 2 shows a situation where the light beam is focused on the L0 layer of an optical disc 101 with the bonding error K, and portion (b) of FIG. 2 shows a situation where the focal point of the light beam has entered the lead-out area of the L1 layer as a result of a focus jump operation.

FIG. 3(a) shows an example of a dual-layer optical disc 102 compliant with the DVD standard, and FIG. 3(b) shows an example of a three-layer optical disc 102 compliant with the BD standard.

Figure 1:
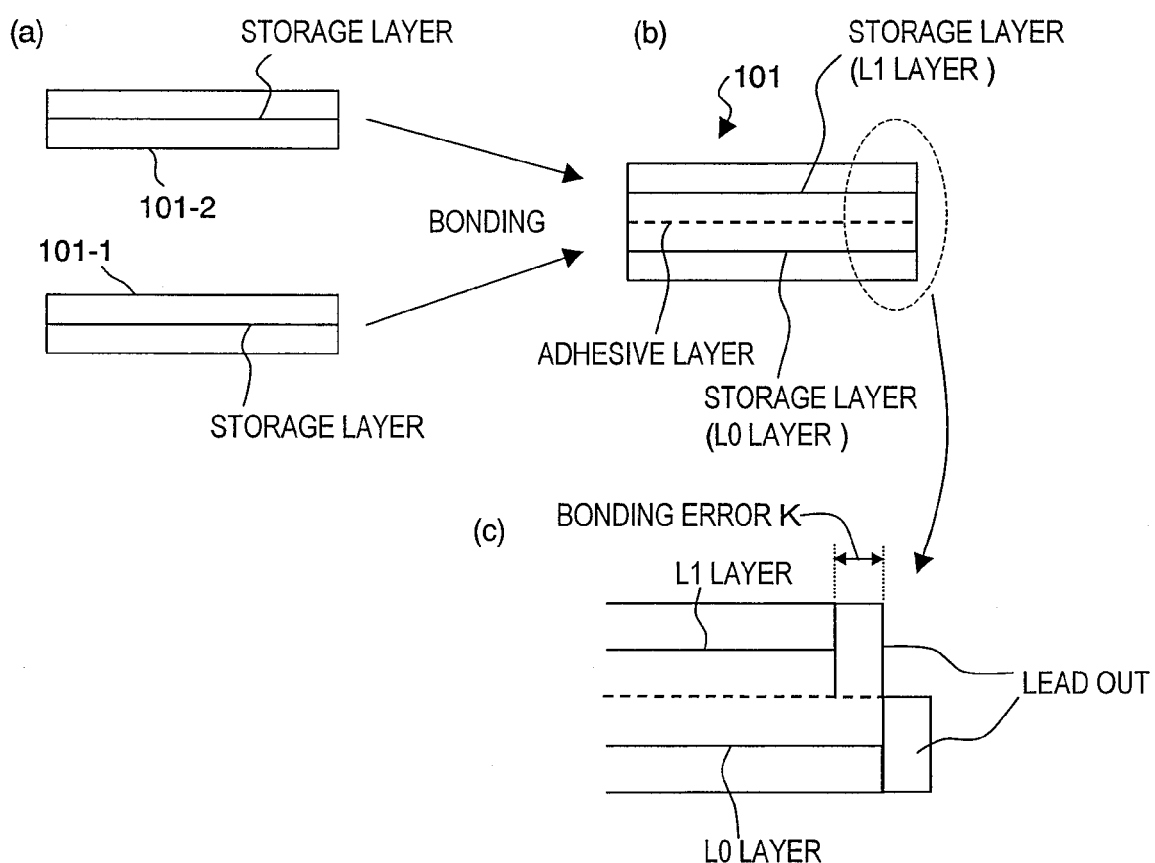
Figure 4:
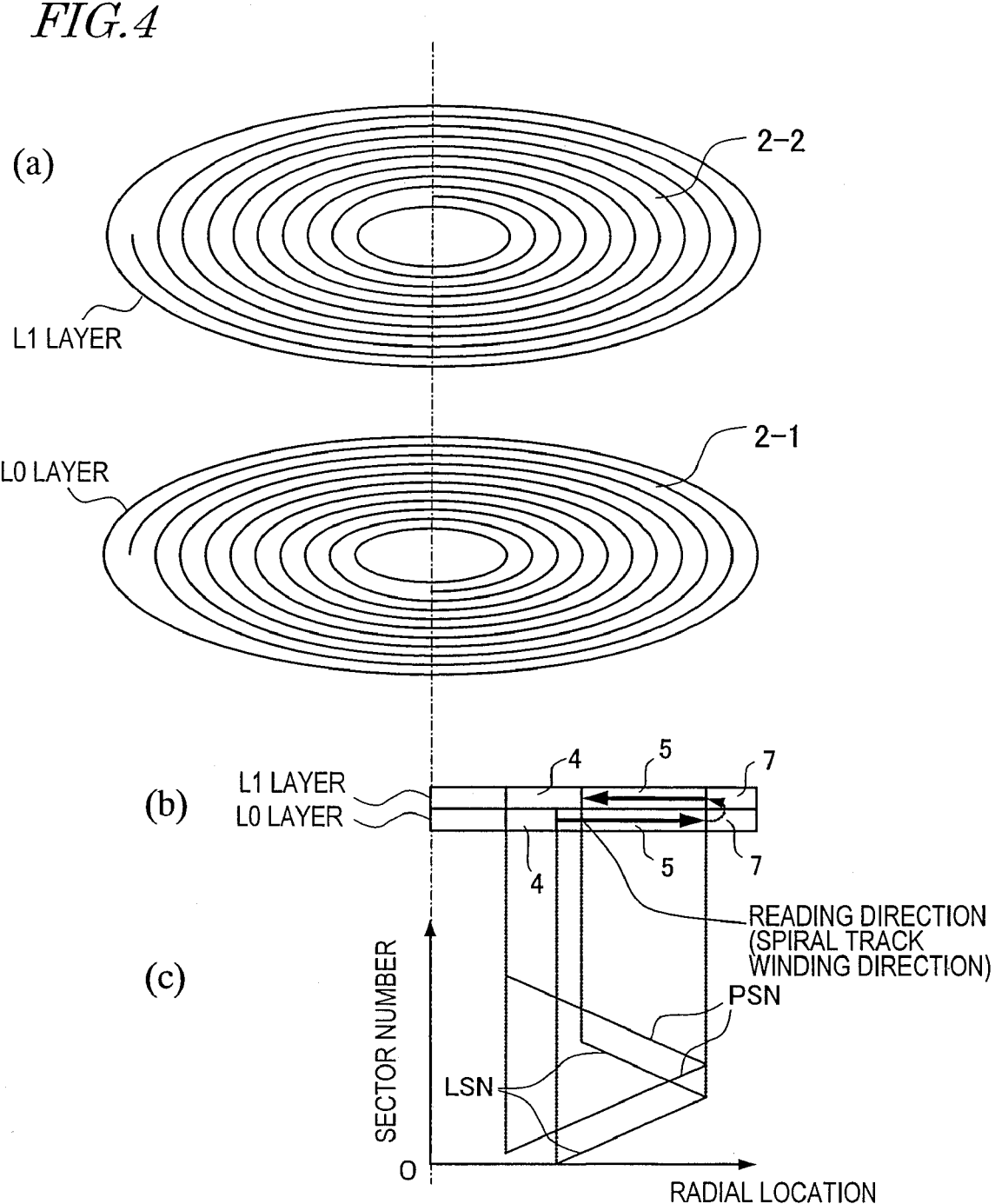

Portions (a) through (c) of FIG. 4 show so-called "opposite track paths" that are tracks of a dual-layer DVD, the reading directions and sector numbers thereof.

FIGS. 5(a) through 5(c) show various ways of writing data on the optical disc 102.

FIG. 6(a) is an enlarged view of recorded areas of L0 and L1 layers, FIG. 6(b) shows an exemplary path that the focal point of the light beam may follow as the optical pickup is moved according to the first preferred embodiment, FIG. 6(c) shows another exemplary path that the focal point of the light beam may follow as the optical pickup is moved according to the first preferred embodiment, and FIG. 6(d) shows a relation between the radial displacement D of the focal point and the magnitude K of the bonding error.

Figure 7:
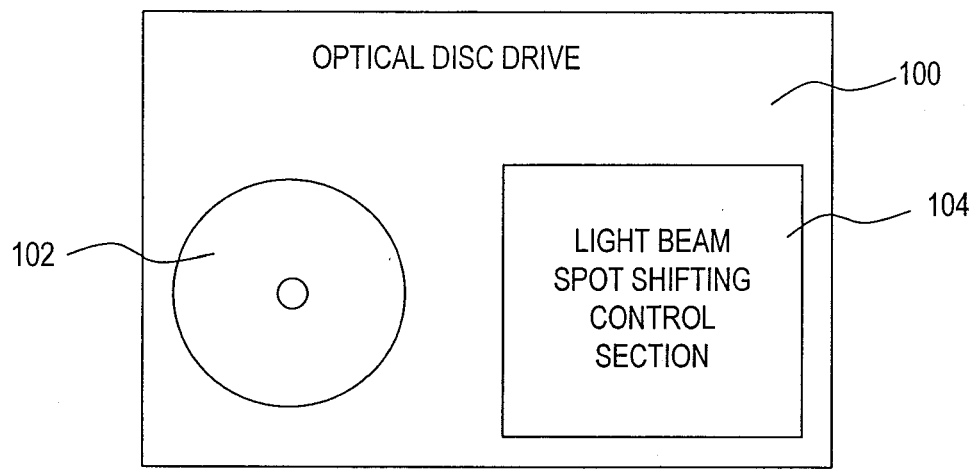

FIG. 7 shows an optical disc drive 100 including a light beam spot shifting control section 104 according to the first preferred embodiment.

Figure 8:
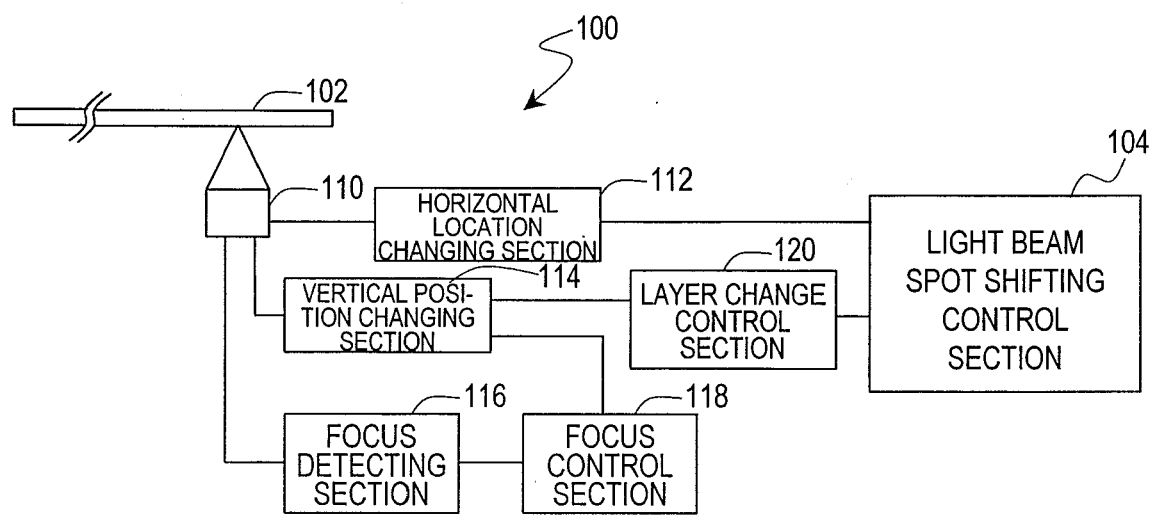

FIG. 8 schematically shows the arrangement of functional blocks in the optical disc drive 100.

Figure 9:
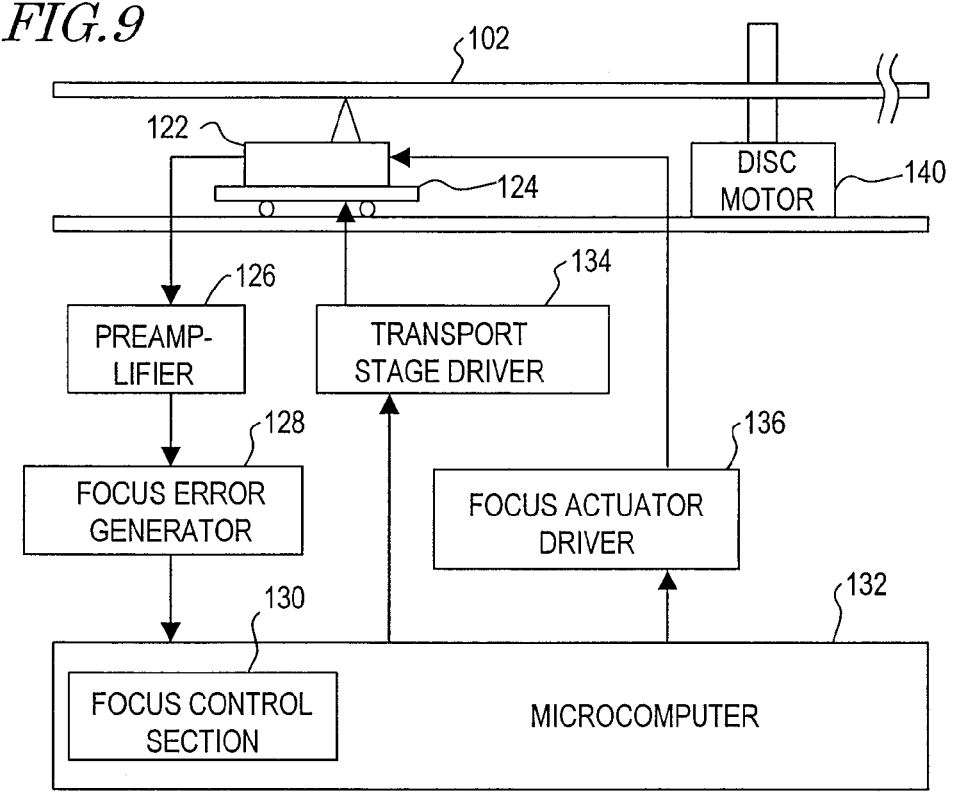

FIG. 9 shows an exemplary hardware configuration for the optical disc drive 100 shown in FIGS. 7 and 8.

Figure 10:
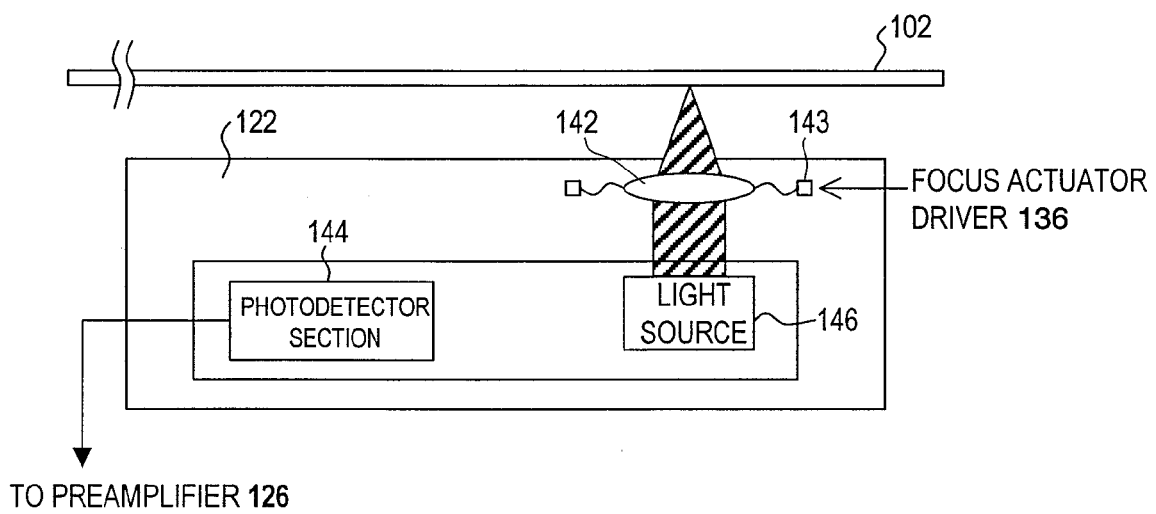

FIG. 10 shows a schematic hardware configuration for the optical pickup 122.

Figure 11:
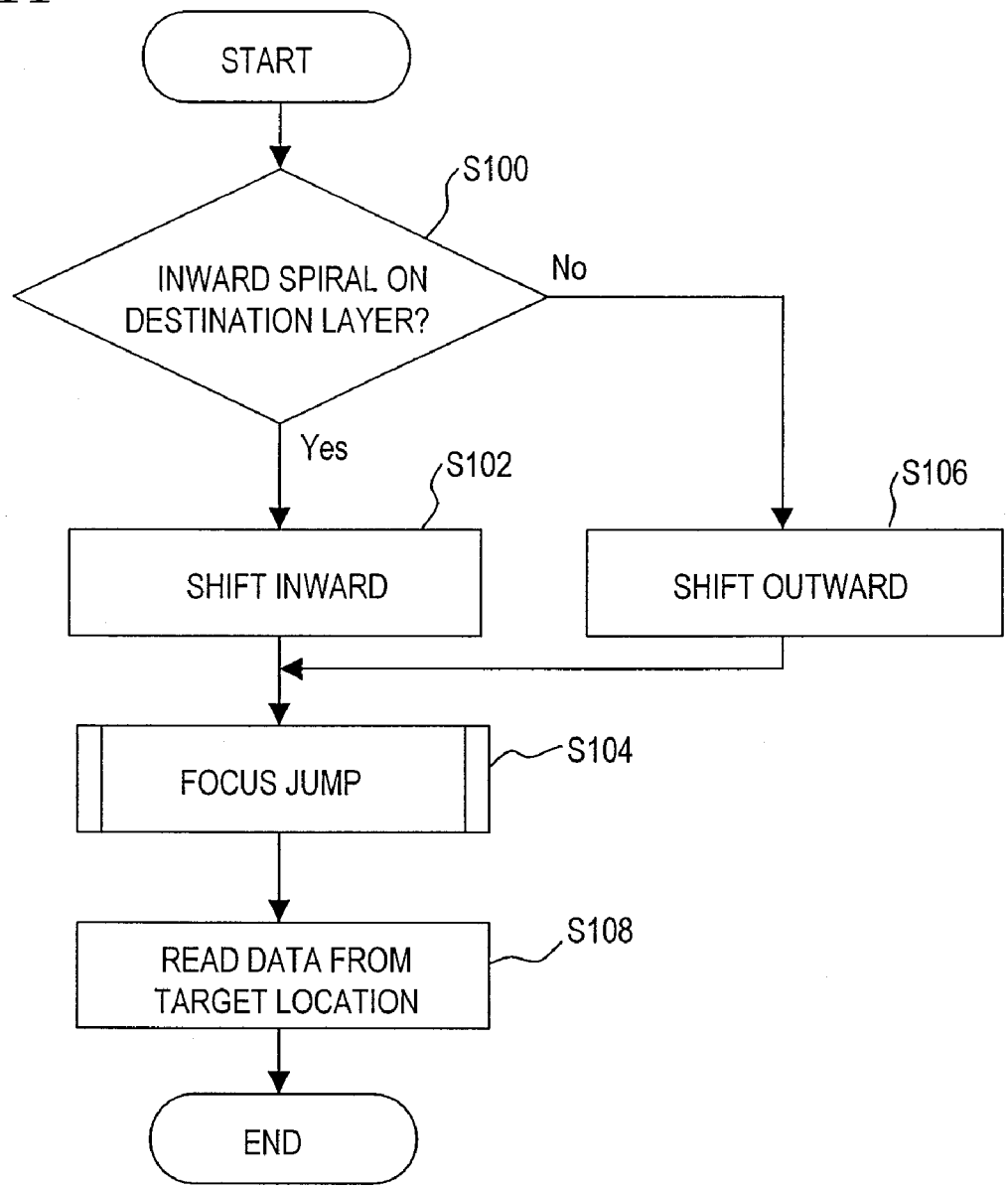

FIG. 11 is a flowchart showing a first procedure of focus shifting control in a situation where a focus jump needs to be made from one storage layer to another.

Figure 12:
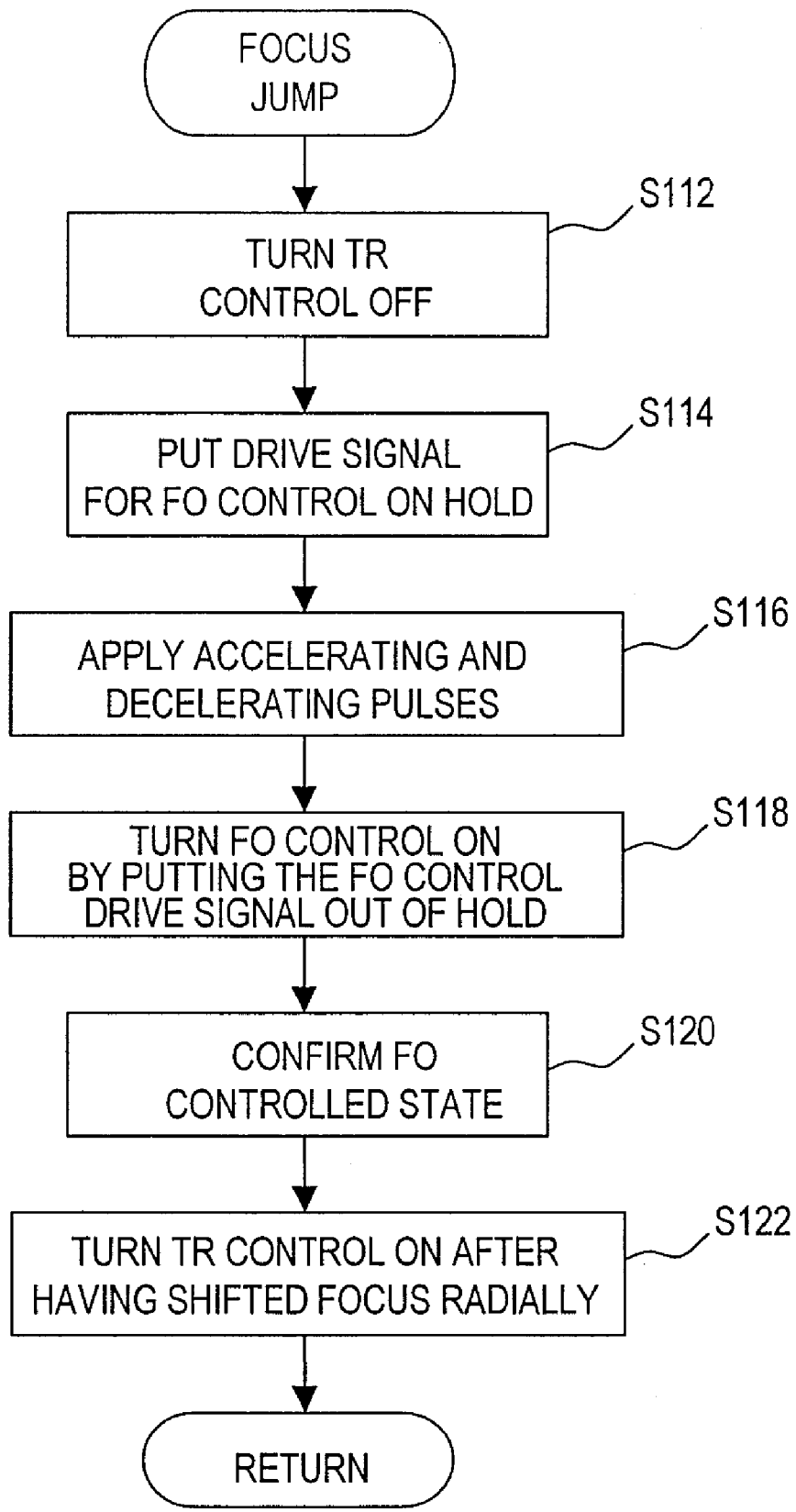

FIG. 12 is a flowchart showing the procedure of the focus jump processing step S104 shown in FIG. 11.

Figure 13:
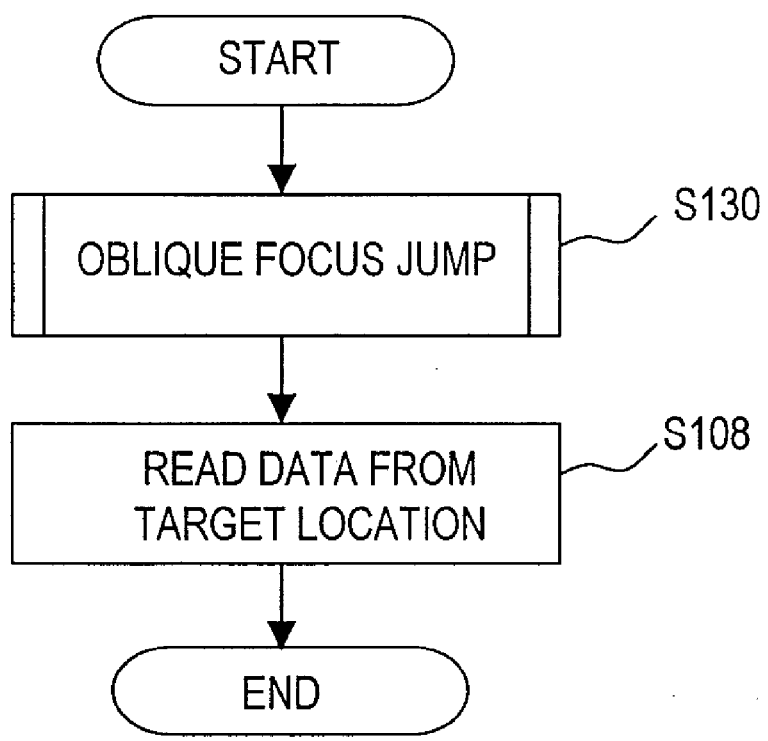

FIG. 13 is a flowchart showing a second focus shifting control procedure in a situation where the focus is jumped from one storage layer to another.

Figure 14:
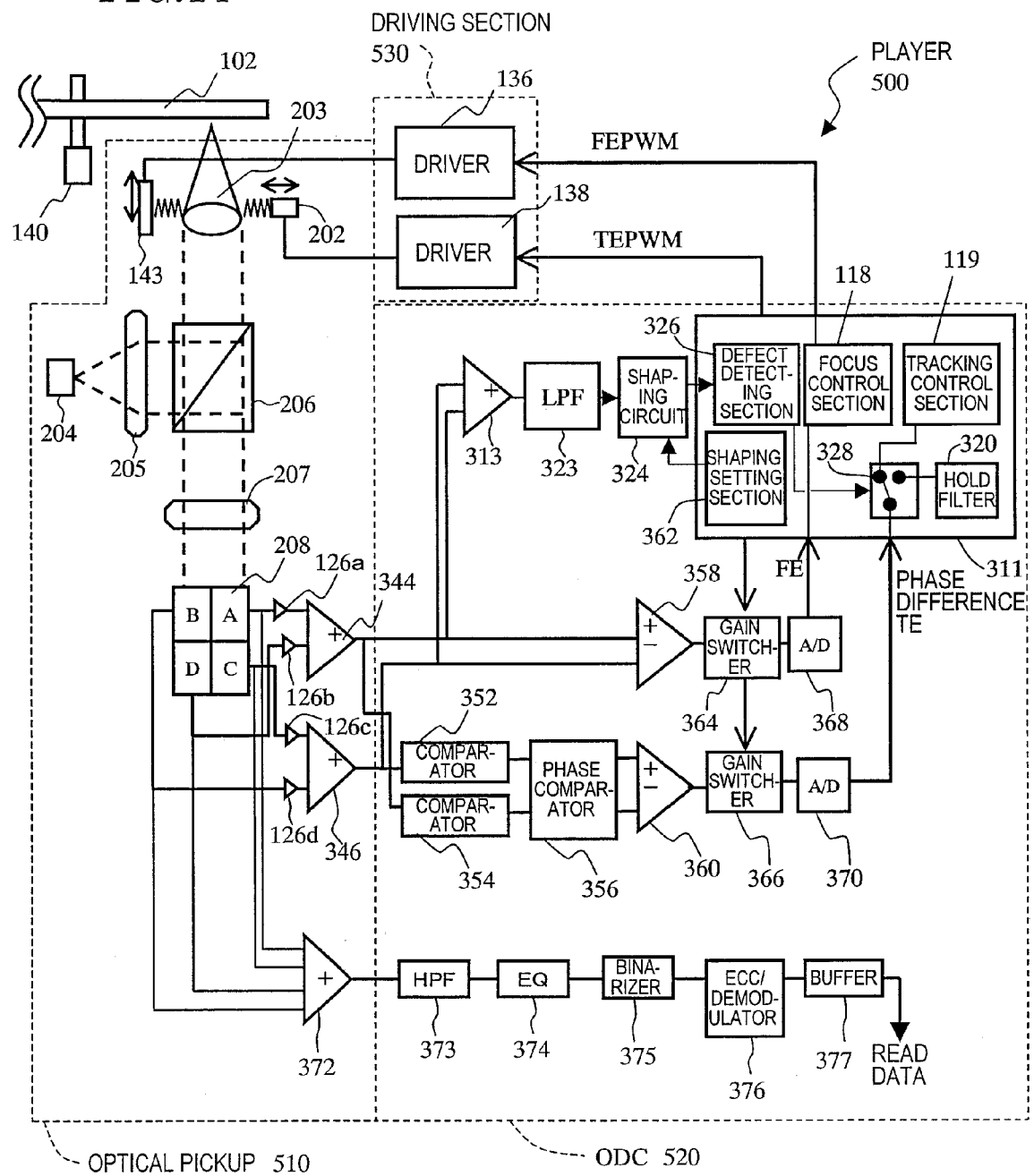

FIG. 14 shows an exemplary hardware configuration for an optical disc player 500 according to the first preferred embodiment.

Figure 15:
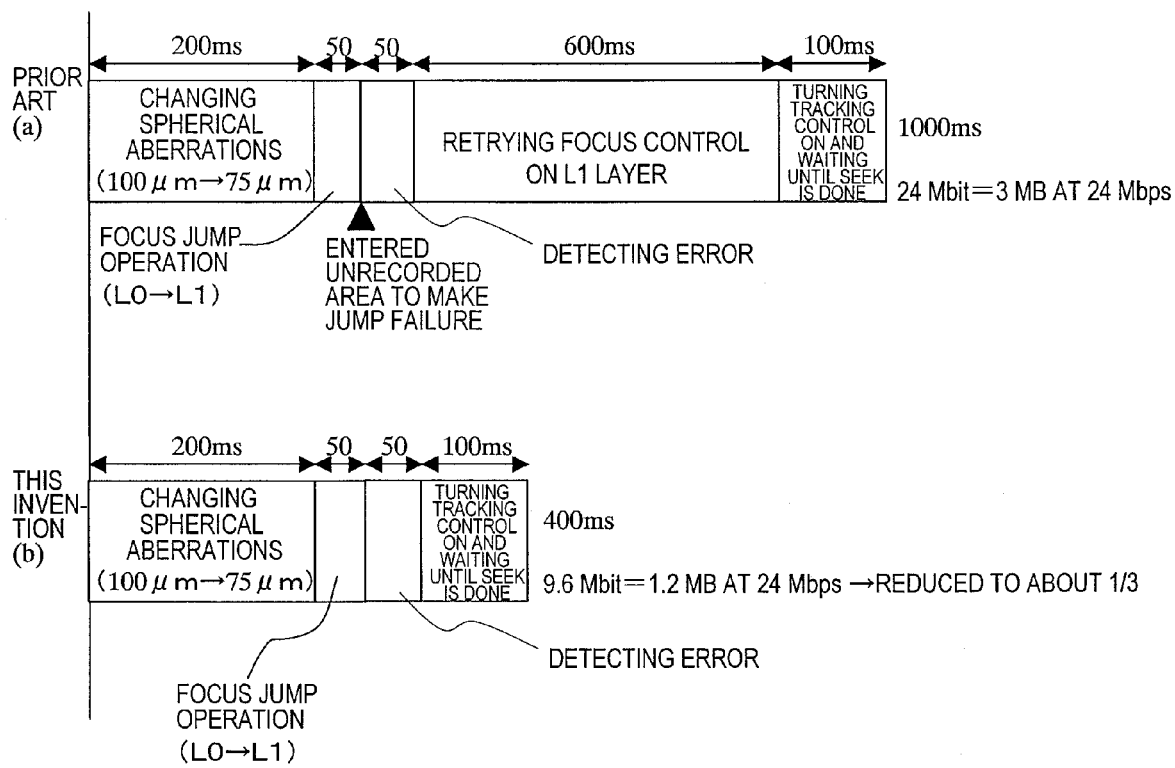

FIG. 15(*a*) shows a condition that determines the storage capacity of a buffer for a conventional player, while FIG. 15(*b*) shows a condition that determines the storage capacity of the buffer 377 of this preferred embodiment.

Figure 16:
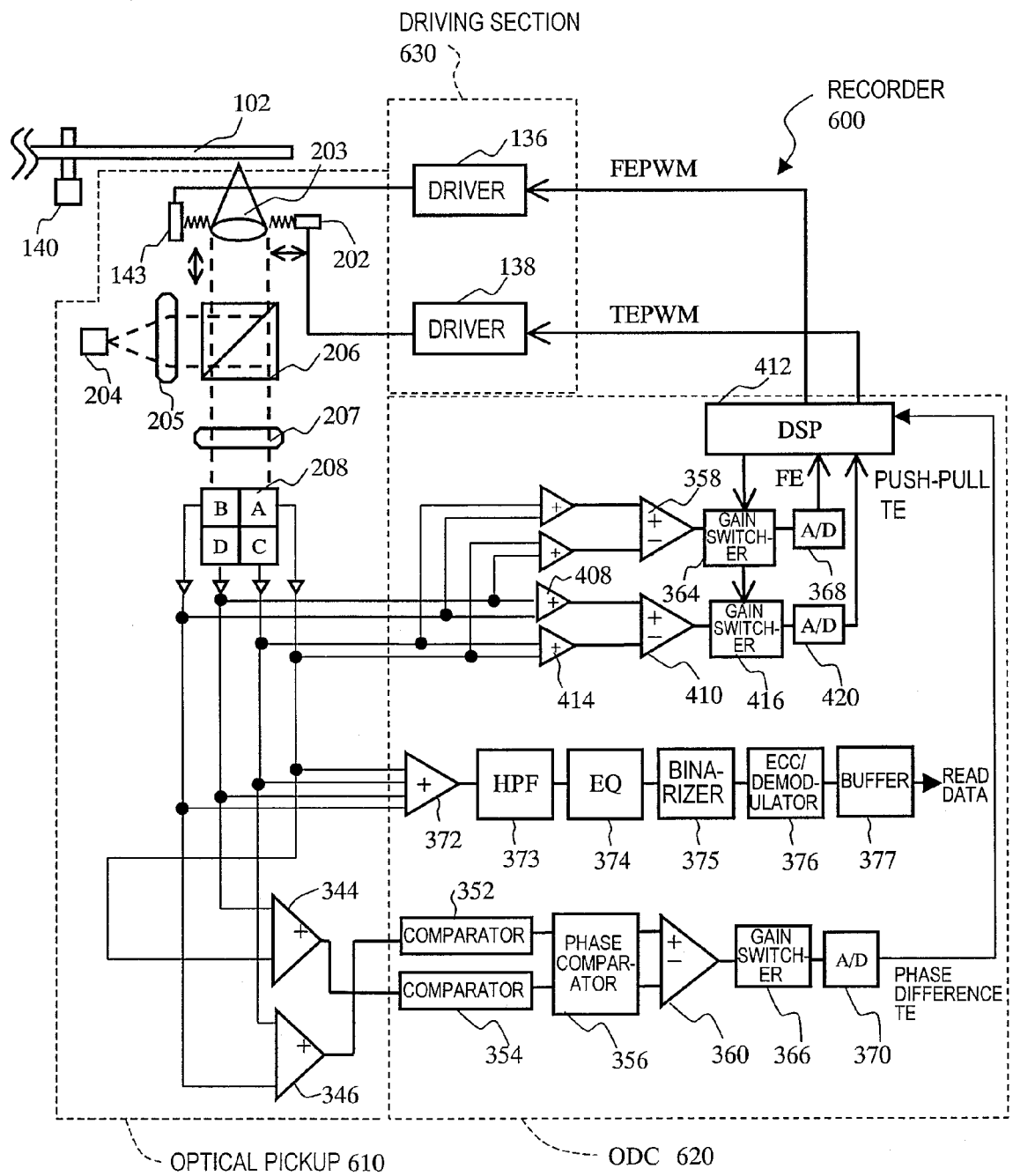

FIG. 16 shows an exemplary hardware configuration for an optical disc recorder 600 according to the first preferred embodiment.

Figure 17:
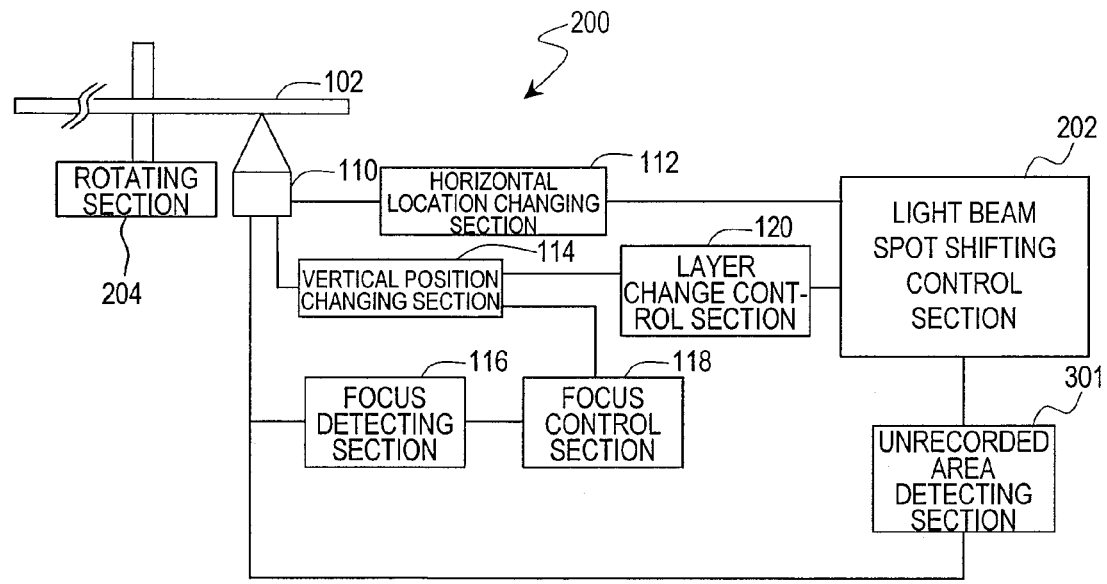

FIG. 17 schematically shows the arrangement of functional blocks in an optical disc drive 200 according to a second preferred embodiment of the present invention.

Figure 18:
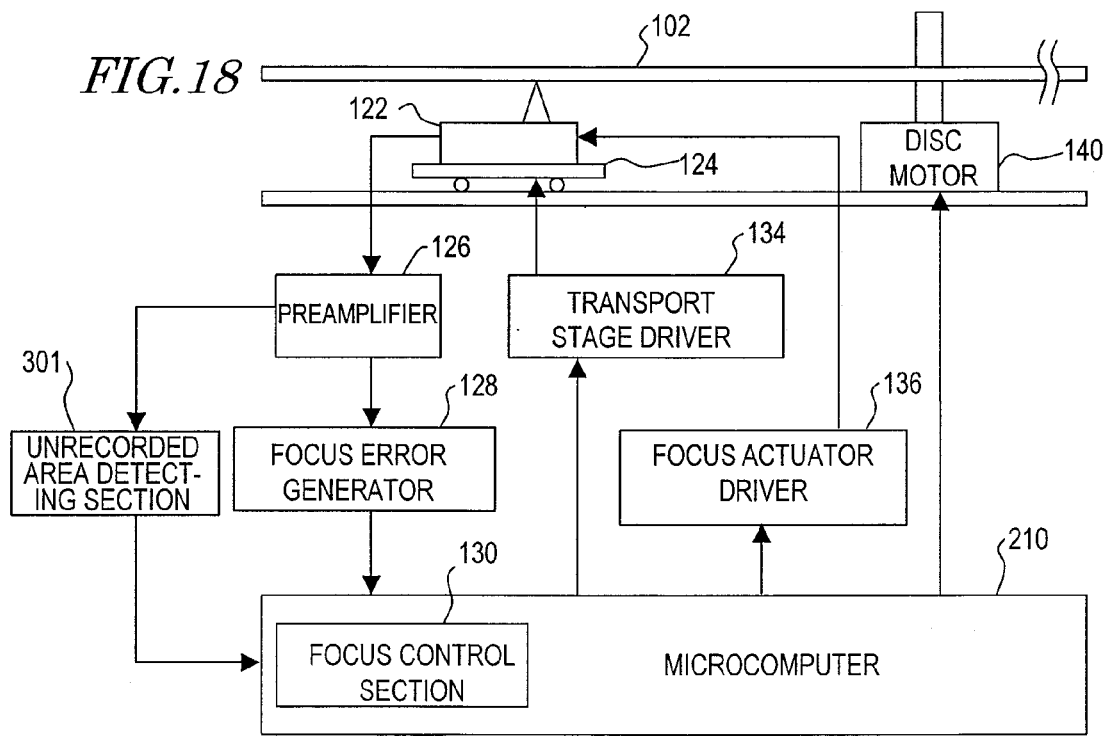

FIG. 18 shows an exemplary hardware configuration for the optical disc drive 100 shown in FIG. 17.

Figure 19:
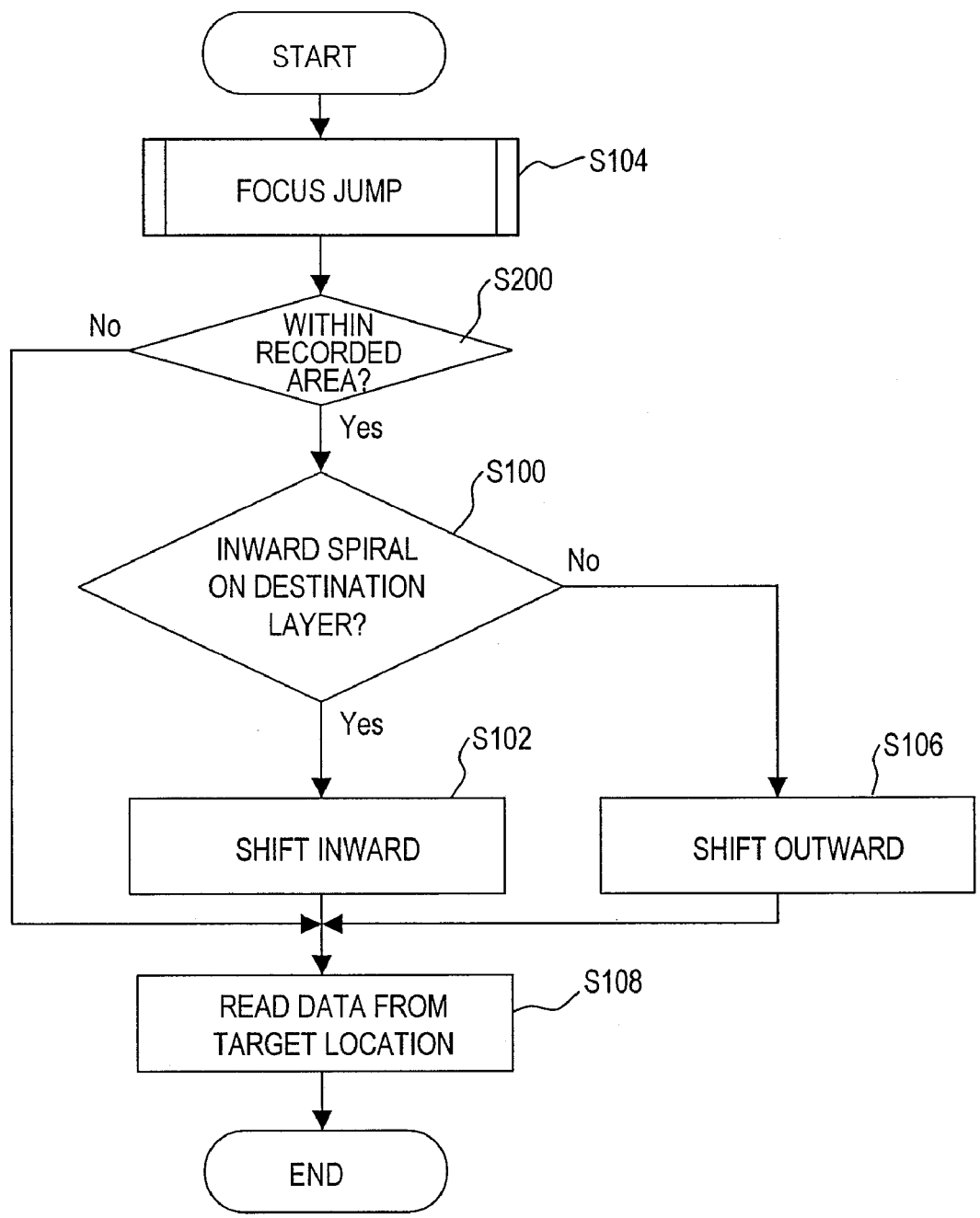

FIG. 19 is a flowchart showing a focus shifting control procedure to be performed in a situation where the focus needs to be jumped from one storage layer to another.

Figure 20:
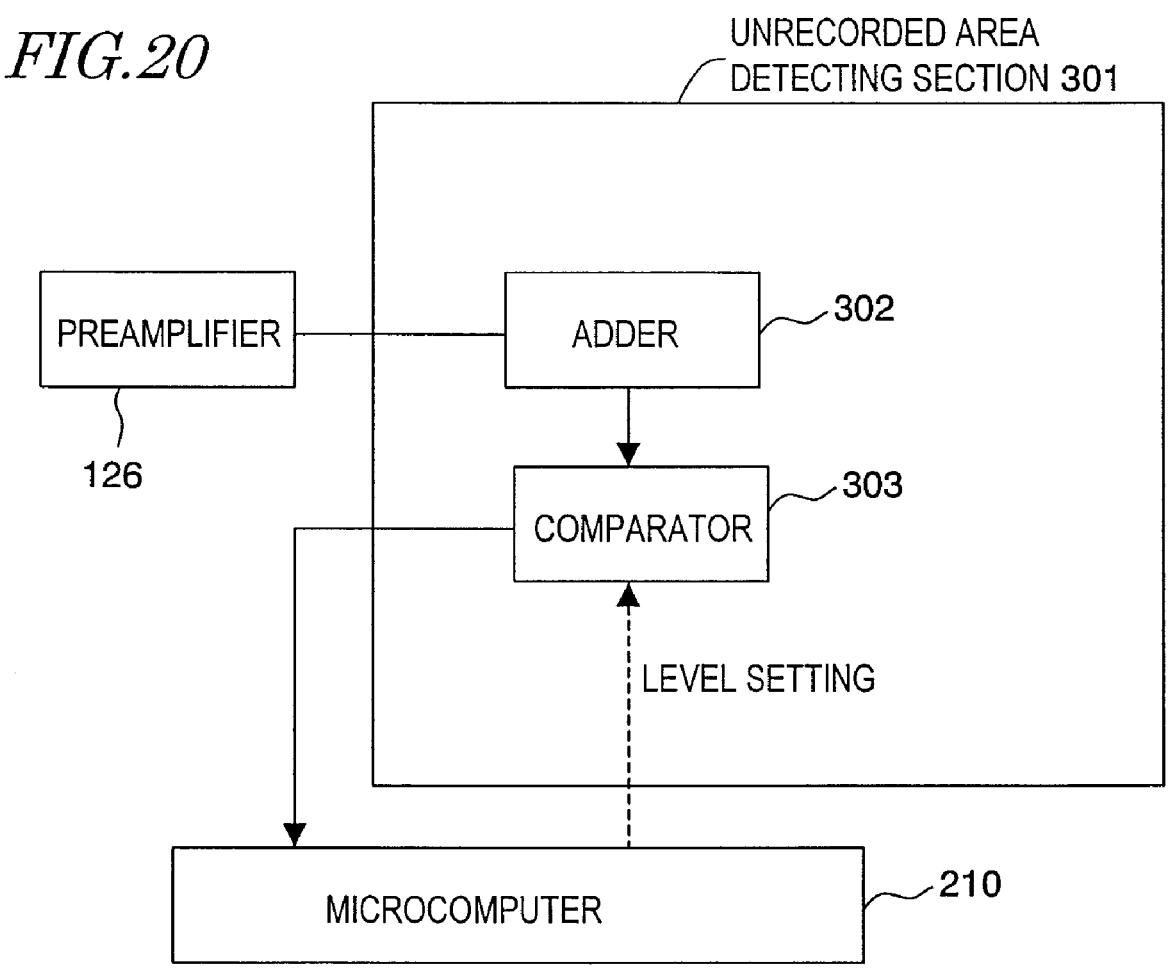

FIG. 20 shows an exemplary hardware configuration for the unrecorded area detecting section 301.

DESCRIPTION OF REFERENCE NUMERALS

100 optical disc drive
102 information storage medium (optical disc)
104, 202 light beam spot shifting control section
110 converging section
112 horizontal location changing section
114 vertical position changing section
116 focus detecting section
118 focus control section
120, 402, 502 layer change control section

BEST MODE FOR CARRYING OUT THE INVENTION

First, the physical and logical structures of an optical disc will be described with reference to FIGS. 3 through 5. After that, a preferred embodiment of an optical disc drive will be described.

The present invention achieves a most significant effect when applied to a combination of a recordable optical disc and an optical disc player, which is an optical disc drive with only playback function. However, as will be described later, the present invention is still effective even when applied to an optical disc drive with recording function.

First of all, an "optical disc" is a storage medium from which data can be at least read with a light beam. In this description, however, the optical disc is supposed to be a recordable one, not a read-only one. The optical disc may be a multilayer disc with two, three or more layers such as a DVD-RAM, a DVD-RW, a DVD-R, a DVD+RW or a DVD+R or a high-density multilayer disc that uses a blue ray, for example.

FIG. 3(*a*) shows an example of a dual-layer optical disc 102 compliant with the DVD standard. The optical disc 102 was made by bonding together a substrate 150-1 with L0 layer and another substrate 150-2 with L1 layer. Each of the L0 and L1 layers of the optical disc 102 can be accessed by irradiating one side of the disc with a light beam. The shallower storage layer as measured from the surface irradiated with the light beam is the L0 layer and the L1 layer is located behind the L0 layer. The optical disc 102 has a thickness of 1.2 mm. Around a depth of 0.6 mm, which is right in the middle of the thickness, the L0 and L1 layers are arranged at an interval of approximately 40 to 70 μm.

On the other hand, FIG. 3(*b*) shows an example of a three-layer optical disc 102 compliant with the BD standard. The optical disc 102 includes a substrate 150 and L0, L1 and L2 layers. Each of the L0, L1 and L2 layers of the optical disc 102 can be accessed by irradiating one side of the disc with a light beam. The optical disc 102 has a thickness of 1.2 mm and the substrate 150 has a thickness of 1.1 mm. The L0, L1 and L2 layers are arranged at intervals of 25 μm. Specifically, the L0, L1 and L2 layers are located at respective depths of 100 μm, 75 μm and 50 μm as measured from the surface of their protective coating 152.

Portions (a) through (c) of FIG. 4 show so-called "opposite track paths" that are tracks of a dual-layer DVD, the reading directions and sector numbers thereof. Specifically, portion (a) of FIG. 4 shows spiral groove patterns 2-1 and 2-2, which are provided for the L0 and L1 layers, respectively. Portion (b) of FIG. 4 shows the light beam scanning directions when user data is read and/or written from/on these storage layers. And portion (c) of FIG. 4 shows how the sector numbers given to the respective storage layers change.

If the optical disc is rotated clockwise, the light beam scans the track 2-1 from an inner area of the L0 layer toward the outer edge thereof and scans the track from an outer area of the L1 layer toward the inner edge thereof. In the playback example shown in portion (b) of FIG. 4, user data is read from the inner edge through the outer edge of the user data area 5 of the L0 layer and then is read from the outer edge through the inner edge of the user data area 5 of the L1 layer. It should be noted that a test area 4 and a lead-out area 7 are respectively arranged inside and outside of the user data area 5 in each of the L0 and L1 layers.

As shown in portion (c) of FIG. 4, physical sector numbers PSN and logical sector numbers LSN are sequentially given to the respective layers so as to increase in the reading direction. However, since the spiral tracks of the L0 and L1 layers are wound in mutually opposite directions, the relation between the sector numbers and the radial locations changes. Specifically, in the user data area 5 of the L0 layer, the logical sector number LSN at the inner edge is zero and increases one by one toward the outer edge.

On the other hand, in the user data area 5 of the L1 layer, the logical sector number LSN is greater by one at the outermost sector than the largest logical sector number of the L0 layer and then increases one by one toward the inner edge. It should be noted that the relation between the logical sector numbers LSN and the radial locations changes according to how to write data on the user data areas 5 of the L0 and L1 layers. The logical sector numbers are continuous even after the storage layers have been changed.

As shown in FIG. 3(a) and portion (a) of FIG. 4, in a dual-layer DVD, the shallower storage layer from the surface irradiated with the light beam is called "L0 layer" while the deeper layer "L1 layer". On the other hand, as shown in FIG. 3(b), in a multilayer BD, the deepest storage layer from the surface irradiated with the light beam is called "L0 layer" and the other storage layers are called "L1 layer", "L2 layer" and so on sequentially. In both of DVDs and BDs, data is read by shifting the focal point from an inner area of L0 layer toward the outer edge thereof, and then from an outer area of L1 layer toward the inner edge thereof.

FIGS. 5(a) through 5(c) show various ways of writing data on the optical disc 102.

Specifically, FIG. 5(a) schematically illustrates how data has been written on the entire user data area 51a of the L0 layer and on a portion 52a of the user data area of the L1 layer. The data thus written forms a single volume (which is a unit of information). Meanwhile, the rest 53a of the user data area of the L1 layer is an unrecorded area.

The state shown in FIG. 5(a) may be the same as that shown in portion (b) of FIG. 4, for example. This optical disc is provided with a single-spiral groove structure. As pointed by the arrows in FIG. 5(a), data can be written on the track of the L0 layer continuously from the inner edge through the outer edge and then on the track of the L1 layer continuously from the outer edge toward the inner edge thereof.

The logical sector numbers are sequentially given to the L0 layer from the innermost location 50a thereof. The logical sector number LSN given to the end of the user data area 51a of the L0 layer is continuous with that given to the beginning of the user data area 52a of the L1 layer.

FIG. 5(b) schematically shows how data has been written on respective portions 51b and 52b of the user data areas. Approximately the same sizes of data are stored in the L0 and L1 layers and collectively form a single volume (a unit of information).

The structure of the optical disc and the directions in which continuous writing can be done on the respective storage layers are the same as in FIG. 5(a). However, in FIG. 5(b), the target locations to write data at are changed halfway through the user data area of the L0 layer into the user data area of the L1 layer. In this case, the logical sector number LSN given to the end 50b of the user data area 51b is continuous with that given to the beginning 50b of the user data area 52b.

FIG. 5(c) schematically shows how data has been written on respective portions of the user data areas of L0, L1 and L2 layers of an optical disc. Approximately the same sizes of data are stored in the L0, L1 and L2 layers and collectively form a single volume (a unit of information).

This optical disc is also provided with a single-spiral groove structure. As pointed by the arrows in FIG. 5(c), data can be written on the track of the L0 layer continuously from the inner edge toward the outer edge, on the track of the L1 layer continuously from an outer area toward the inner edge thereof, and then on the track of the L2 layer continuously from the inner edge toward the outer edge thereof.

In the examples shown in FIGS. 5(a), 5(b) and 5(c), each pair of two adjacent layers L0 and L1 or L1 and L2 has spiral tracks that are wound in mutually opposite directions.

As for the recorded areas, the logical sector number LSN given to the end of the recorded area on the L0 layer is continuous with that given to the beginning of the recorded area on the L1 layer. In the same way, the logical sector number LSN given to the end of the recorded area on the L1 layer is continuous with that given to the beginning of the recorded area on the L2 layer.

No matter in which of the three ways shown in FIGS. 5(a) through 5(c) data has been written, if the focal point of the light beam were just moved from the end of the recorded area of the L0 layer in the depth direction of the substrate, then the focal point would reach the beginning of the recorded area of the L1 layer, i.e., the boundary between the recorded and unrecorded areas of the L1 layer, and there would a strong chance of servo control failure. Furthermore, if the focal point happened to shift in the opposite direction to the intended reading direction of the L1 layer, the focal point would also enter the unrecorded area to make it difficult to avoid a servo control failure.

On top of that, if the writing method shown in FIG. 5(a) is adopted, the write operation will be affected significantly by a bonding error of the optical disc.

Thus, preferred embodiments of the present invention will be described in detail as being applied to a situation where the writing method shown in FIG. 5(a) is adopted.

Embodiment 1

Figure 6:
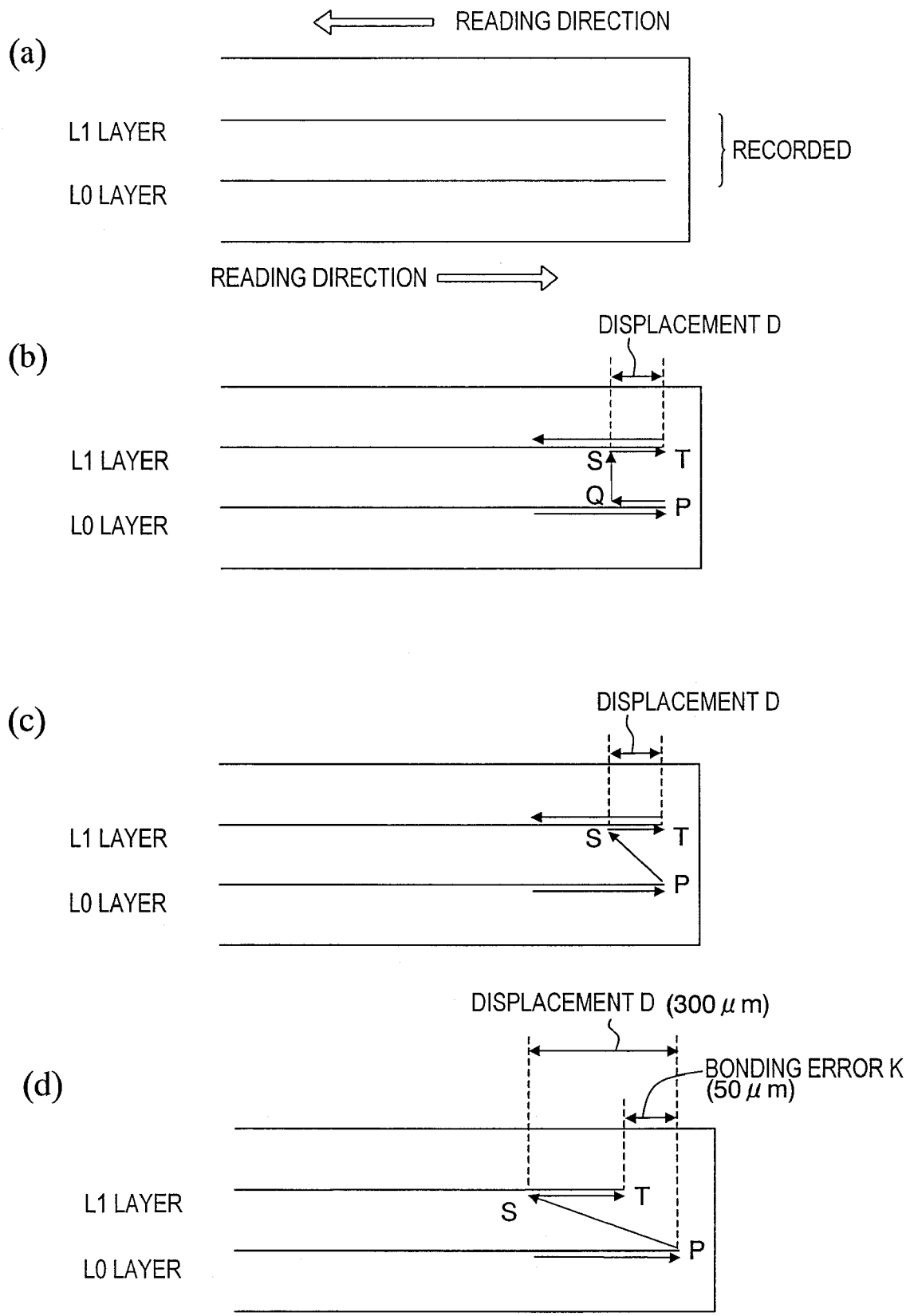

First, it Will be Outlined with Reference to FIG. 6 how the optical disc drive of this preferred embodiment performs a focus shifting control operation. After that, the configuration and operation of the optical disc drive will be described in detail.

FIG. 6(a) is an enlarged view of L1 and L1 layers, where recorded areas are included in the outermost portion of the optical disc.

The optical disc drive of this preferred embodiment is partly characterized by driving the optical pickup away from the unrecorded area of the destination storage layer intentionally while making a focus jump. That is to say, the optical pickup is driven in a radial direction opposite to the direction that leads to the unrecorded area of the destination storage layer. As a result, it is possible to prevent the focal point of the light beam from entering the unrecorded area. Hereinafter, it will be described more specifically how this optical disc drive works.

FIG. 6(b) shows an exemplary path that the focal point of the light beam may follow as the optical pickup is moved according to this preferred embodiment. Until data has been read from the L0 layer, the optical disc drive controls the position of the optical pickup such that the focal point of the light beam moves in a radial direction that leads to the outer edge. When the focal point reaches the terminal location P, the data will have been read from the L0 layer. After that, the focal point of the light beam will be shifted to the locations Q, S and T in this order.

More specifically, the focal point of the light beam is intentionally shifted from the location P to the location Q on the same L0 layer in the opposite direction (i.e., toward the inner edge) by a displacement D and then a focus jump is made. As a result, the focal point reaches the location S on the L1 layer, which is within the recorded area of the L1 layer. That is why at that location, the reflectance is generally constant and does not vary significantly, thus realizing stabilized tracking control and focus control. And when a servo control is started on the L1 layer, the optical disc drive shifts the focal point toward the outer edge to the initial location T, where the optical disc drive resumes reading the rest of the data.

The direction in which the focal point has been shifted intentionally from the location P to the location Q is the radial direction that does not lead to the unrecorded area caused by a bonding error, for example, i.e., the radial direction in which the spiral track of the L1 layer is wound.

FIG. 6(c) shows another exemplary path that the focal point of the light beam may follow as the optical pickup is moved according to this preferred embodiment. Until data has been read from the L0 layer, the optical disc drive controls the position of the optical pickup such that the focal point of the light beam moves in a radial direction that leads to the outer edge.

When the focal point reaches the terminal location P, the data will have been read from the L0 layer. After that, the focal point of the light beam will be shifted to the locations S and T in this order. The focal point is shifted from the location P to the location S by moving it both inward by the displacement D and in the substrate depth direction simultaneously. That is to say, the focus jump is made obliquely so to speak. Thereafter, when a servo control is started at the location S, the focal point is also shifted from the location S to the location T as described above.

FIG. 6(d) shows a relation between the displacement D of the focal point in the radial direction and the magnitude K of the bonding error. If the magnitude K of bonding error is supposed to be 50 μm, the displacement D of the focal point in the radial direction may be approximately 300 μm, which is defined to be greater than the estimated magnitude of eccentricity of the disc. The magnitude of eccentricity of a BD may be approximately ±37.5 μm, while that of a DVD may be approximately ±50 μm. It should be noted that the "magnitude of eccentricity" generally means the maximum width of deviation during a single turn of a disc. In this preferred embodiment, however, the width of deviation due to eccentricity needs to be considered at least during a focus jump period (e.g., 50 ms in the example shown in FIG. 15 as will be described later).

The displacement D is defined to be much greater than the estimated magnitude K of bonding error. That is why even if the optical disc 102 had a bonding error, the focal point could be moved to the recorded area of the L1 layer without fail. As a result, servo controls such as focus control and tracking control can be performed just as intended, the focus jump never fails, and even data that is stored over the L0 and L1 layers can be read continuously. The example shown in FIG. 6(d) corresponds to that shown in FIG. 6(c). However, the displacement D may also be the same in the example shown in FIG. 6(b), too.

In the examples shown in FIGS. 6(b) and 6(c), since the data has been read from the location P and until the focal point of the light reaches the location T, the rest of the data cannot be read. However, playback of video and so on needs to be continued in the meantime. That is why a buffer for temporarily storing data should be provided to supply data that does not discontinue playback even while the focal point is moving from the location P to the location T. It is just normal to provide such a buffer and its storage capacity may be determined based on various playback conditions. According to the focus shifting control method of the present invention, however, the required buffer capacity can be reduced significantly. The reason will be described in detail later with reference to FIG. 15.

Hereinafter, the configuration of an optical disc drive 100 that realizes such processing will be described with reference to FIGS. 7 through 10. The functional structure of the optical disc drive 100 will be described first, and then its hardware configuration thereof will be described.

FIG. 7 shows an optical disc drive 100 including a light beam spot shifting control section 104. An optical disc 102 is also shown in FIG. 7 but is removable from the optical disc drive 100 and does not form an integral part of the optical disc drive 100.

The light beam spot shifting control section 104 (which will be simply referred to herein as a "spot shifting control section 104") controls the operations of the other components of the optical disc drive 100 (to be described later) that are going to access the optical disc 102 so as to shift the focal point of the light beam that should be converged on a storage layer of the optical disc 102. It should be noted that the "spot" of a light beam is perceived as a cross section of the light beam that has been formed on a storage layer being irradiated with the light beam. However, the "spot" of the light beam is synonymous herein with the focal point of the light beam.

The spot shifting control section 104 performs control to search for a desired track on the target storage layer, i.e., the storage layer to which the focal point should be shifted. Also, the spot shifting control section 104 determines whether or not a focus jump needs to be made. Furthermore, the spot shifting control section 104 determines whether the beam spot should be shifted inward or outward and performs a light beam spot shifting control in the procedure associated with the shifting direction. By performing these operations to be described in detail later, the optical disc drive 100 can control the optical head to access the target location while avoiding the unrecorded area of the optical disc 102 and can improve the layer-to-layer access performance involving a focus jump.

In making a focus jump from one storage layer to the other target storage layer, the spot shifting control section 104 controls the focus shift in the following manner. Specifically, if the focal point of the light beam needs to be shifted toward the outer edge of the optical disc 102 with respect to the current location, then the spot shifting control section 104 shifts the focal point to the target storage layer and then moves it outward. On the other hand, if the focal point of the light beam needs to be shifted toward the inner edge of the optical disc 102 with respect to the current location, then the spot shifting control section 104 moves the focal point inward and then shifts it to the target storage layer.

FIG. 8 schematically shows the arrangement of functional blocks in the optical disc drive 100. The optical disc drive 100 includes a converging section 110, a horizontal location changing section 112, a vertical position changing section 114, a focus detecting section 116, a focus control section 118, a layer change control section 120 and the spot shifting control section 104.

The converging section 110 converges the light beam on a storage layer of the optical disc 102. The converging section 110 may be an optical lens (e.g., objective lens), which may have an NA of 0.6 or more or an NA of 0.85 or more.

The vertical position changing section 114 moves the converging section 110 substantially perpendicularly to the storage layers. The vertical position changing section 114 may be an actuator, for example.

The focus detecting section 116 generates a signal representing the converging state of the light beam with respect to the storage layer. For example, the focus detecting section 116 may generate an error signal representing the vertical deviation of the focal point of the light beam from the optical disc 102 (i.e., a focus error signal).

In accordance with the output signal of the focus detecting section 116, the focus control section 118 drives the vertical position changing section 114, thereby controlling and keeping the converging state of the light beam on the storage layer substantially constant. Also, the focus control section 118 may turn the focus control OFF before the focus jump is made and may turn the focus control ON after the focus jump has been made.

The layer change control section 120 jumps the focal point of the light beam, which has been converged on one of the multiple storage layers, to the target storage layer. The layer change control section 120 may drive the vertical position changing section 114 in such a manner as to control the focus jump operation arbitrarily.

The horizontal location changing section 112 horizontally shifts the focal point of the light beam either inward or outward on the optical disc 102. For example, the horizontal location changing section 112 may shift the focal point of the light beam across the tracks on the storage layer of the optical disc 102 by displacing the converging section 110 either inward or outward under the optical disc 102.

FIG. 9 shows an exemplary hardware configuration for the optical disc drive 100 shown in FIGS. 7 and 8. The optical disc drive 100 includes a disc motor 140, an optical pickup 122, a preamplifier 126, a focus actuator driver 136, a transport stage 124, a transport stage driver 134, a focus error generator 128, a focus control section 130 and a microcomputer 132.

The disc motor 140 rotates the optical disc 102 at a predetermined rotational velocity.

The microcomputer 132 includes the focus control section 130 and controls the focus actuator driver 136 and the transport stage driver 134.

Responsive to a focus error signal that has been supplied from the focus error generator 128 to be described later, the focus control section 130 performs a filter operation for the purpose of phase compensation or gain compensation, thereby outputting a control signal.

The transport stage driver 134 drives the transport stage 124 by outputting a drive signal thereto. The transport stage 124 moves the optical pickup 122 in the radial direction of the optical disc 102.

The optical pickup 122 emits a light beam, thereby forming a light beam spot on the storage layer of the optical disc 102. Also, on receiving the light beam that has been reflected from the optical disc 102, the optical pickup 122 outputs a signal representing the intensity of the reflected light.

The preamplifier 126 converts a current signal, which has been supplied from the photodetector section 144 (to be described later) of the optical pickup 122, into a voltage signal.

In response to the output signal of the preamplifier 126, the focus error generator 128 outputs a focus error (FE) signal representing how much the focal point of the light beam has deviated from the optical disc 102 in the perpendicular direction (i.e., the magnitude of focus error). The FE signal is used to perform a control operation that makes the light beam have a predetermined converging state on the storage layer of the optical disc 102. In other words, the FE signal is used to perform a control operation that keeps the focal point of the light beam located right on the storage layer.

The FE signal may be generated by any method: an astigmatism method, a knife edge method or a spot sized detection (SSD) method, for example. The circuit configuration of the focus error generator 128 may also be changed appropriately with the detection method adopted.

In response to control signals supplied from the microcomputer 132 and focus control section 130, the focus actuator driver 136 drives the focus actuator 143 (to be described later) that is provided inside the optical pickup 122.

FIG. 10 shows a schematic hardware configuration for the optical pickup 122. The optical pickup 122 includes a light source 146, an optical lens (or objective lens) 142, a photodetector section 144, and a focus actuator 143.

The light source 146 outputs a light beam and may be a semiconductor laser, for example. The wavelength of the light beam is determined according to the type of the optical disc 102 in which the data to read is stored. For instance, if the optical disc 102 is a write-once dual-layer DVD, the light source 146 outputs a light beam with a wavelength of 680 nm or less. On the other hand, if the optical disc 102 is a write-once dual-layer Blu-ray disc, then the light source 146 outputs a light beam with a wavelength of 410 nm or less.

The optical lens 142 converges the light beam that has been emitted from the light source 146, thereby forming a focal point. Also, the optical lens 142 transmits the light beam that has been reflected from the optical disc 102. On receiving the light that has been reflected from the optical disc 102 and then transmitted through the optical lens 142, the photodetector section 144 converts the optical signal into an electrical signal (e.g., a current signal). The photodetector section 144 may have four divided areas, for example. The focus actuator 143 moves the optical lens 142 up and down substantially perpendicularly to the storage layer of the optical disc 102 (which will be referred to herein as "perpendicularly"). By getting the optical lens 142 moved by the focus actuator 143, the focal point of the light beam can be located right on the storage layer of the optical disc 102.

There is the following correspondence between the hardware configurations shown in FIGS. 9 and 10 and the arrangements of functional blocks shown in FIGS. 7 and 8. Specifically, the optical lens 142 is equivalent to the converging section 110 shown in FIG. 8. The photodetector section 144, preamplifier 126 and focus error generator 128 together form the focus detecting section 116 shown in FIG. 8. The focus actuator driver 136 and focus actuator 143 correspond to the vertical position changing section 114 shown in FIG. 8. Also, the microcomputer 132 with the focus control section 130 performs the functions of the spot shifting control section 104, layer change control section 120 and focus control section 118 shown in FIG. 8.

Next, it will be described with reference to FIGS. 11 through 13 how the optical disc drive 100 operates. First, the procedure of shifting the focal point along the path shown in FIG. 6(b) will be described.

Supposing a series of video or audio data that is stored over multiple storage layers needs to be read continuously, a focus jump should be made from one storage layer to another during reading. FIG. 11 is a flowchart showing a first procedure of focus shifting control in a situation where a focus jump needs to be made from one storage layer to another.

First, in Step S100, the spot shifting control section 104 determines whether information has been written inward or outward in the destination storage layer.

For example, suppose data is read from a dual-layer disc such as that shown in FIG. 5(b). When data has been read from the user data area 51b of the L0 layer, the spot shifting control section 104 determines that the location 50b of the current storage layer L0 and the desired track on the target storage layer L1 are at the same radial location.

The reading direction on the target storage layer L1 is inward, which is opposite to the previous reading direction. Thus, the spot shifting control section 104 instructs the horizontal location changing section 112 to intentionally shift the focal point inward to a predetermined location in Step S102. The displacement D may be 300 μm, for example. This shift can be done when the transport stage driver 134 applies a drive voltage that would cause an inward displacement of 300 μm to the transport stage 124.

After that, the spot shifting control section 104 instructs the layer change control section 120 to jump the focus to the target storage layer L1 in Step S104. In this case, the operation of moving the focal point to the L1 layer and then intentionally shifting it outward by the displacement D will also be referred to herein as a "focus jump operation". This is because as the focal point has been shifted inward by the displacement D in the processing step S102, the focal point should go outward back to its original location.

As a result, the focal point is now located on the desired track at the location 50b of the L1 layer and data can be read again from that location 50b in Step S108.

Hereinafter, it will be described how the optical disc drive 100 operates in a situation where data needs to be read from a three-layer disc such as that shown in FIG. 5(c). First, suppose data has already been read from the L0 and L1 layers. Since the focus jump from the L0 layer to the L1 layer is made in quite the same way as in FIG. 5(b), the description thereof will be omitted herein.

When data has been read from the user data area 50a of the L1 layer, the spot shifting control section 104 determines that the location 50a on the current storage layer L1 and the desired track on the target storage layer L2 are at the same radial location.

The reading direction on the target storage layer L2 is outward, which is opposite to the previous reading direction. Thus, the spot shifting control section 104 instructs the horizontal location changing section 112 to intentionally shift the focal point outward to a predetermined location in Step S106. The displacement D may be 300 μm, for example.

After that, the spot shifting control section 104 instructs the layer change control section 120 to jump the focus to the target storage layer L2 in Step S104. As in the example described above, the operation of moving the focal point to the L2 layer and then intentionally shifting it inward by the displacement D will also be referred to herein as a "focus jump operation". As a result, the focal point is now located on the desired track at the location 50a of the L2 layer and data can be read again from that location 50a in Step S108. Then, data is read continuously from the L2 layer and continues to be read along the spiral track normally through the end of the content unless the user interrupts the read operation.

Hereinafter, a detailed flow of the focus jump processing step S104 will be described. FIG. 12 is a flowchart showing the procedure of the focus jump processing step S104.

First, to start the focus jump processing step, the microcomputer 132 turns the tracking control OFF in Step S112. Also, the microcomputer 132 puts a focus control drive signal on hold in Step S114.

Next, in Step S116, the microcomputer 132 and the focus control section 130 generate an accelerating pulse signal and a decelerating pulse signal, and apply them to the focus actuator 143 by way of the focus actuator driver 136. The accelerating and decelerating pulse signals are respectively used to increase and decrease the velocity of the optical lens 142 moving in the perpendicular direction. By applying these pulse signals, the focal point can now be located on the target storage layer.

When the FE signal reaches a focus controllable level with respect to the target storage layer, the microcomputer 132 and the focus control section 130 turns the focus control ON in Step S118 by putting the focus control drive signal out of hold.

Next, in Step S120, the microcomputer 132 and the focus control section 130 confirm, based on various signals including the tracking error (TE) signal and an RF signal, that the focal point is now located on the storage layer (i.e., the focal point is keeping track of the storage layer).

Then, the microcomputer 132 supplies a drive signal to a traverse motor (not shown), thereby driving the transport stage 124 on which the optical head is mounted. As a result, the focal point shifts either inward or outward. The driving direction of the transport stage 124 changes depending on whether the processing step to perform in FIG. 11 is S102 or S106. If the processing step S102 has been performed, the transport stage 124 is driven outward so that the focal point shifts outward. On the other hand, if the processing step S106 has been performed, the transport stage 124 is driven inward so that the focal point shifts inward.

Thereafter, in Step S122, the microcomputer 132 turns the tracking control ON and then looks for predetermined track and sector address to reach the target track.

Next, the procedure of shifting the focal point along the path shown in FIG. 6(c) will be described. FIG. 13 is a flowchart showing a second focus shifting control procedure in a situation where the focus is jumped from one storage layer to another. In FIG. 13, the same processing step as that shown in FIG. 11 is identified by the same reference numeral and the description thereof will be omitted herein.

Instead of the light beam spot shifting control shown in FIG. 11, the spot shifting control section 104 shifts the focal point either toward the inner edge of the disc or toward the outer edge thereof while jumping the focus in Step S130. That is to say, this oblique focus jump processing step S130 includes the respective processing steps S100, S102, S106 and S104 shown in FIG. 11. This shifting control is also performed when seamless playback needs to get done by shifting the light beam spot from the L0 layer, from which data has been read continuously, to another layer L1.

Next, a more specific preferred embodiment and the significant effect of the present invention to be achieved by that preferred embodiment will be described with reference to FIGS. 14 and 15.

FIG. 14 shows an exemplary hardware configuration for an optical disc player 500 according to this preferred embodiment.

The player 500 is a read-only device that can read data from an optical disc 102 such as a BD-R but cannot write data on the optical disc 102.

The player 500 gets the reflected light of the light beam, with which the optical disc has been irradiated, detected in a plurality of photosensing areas of the photodetector and performs a tracking error control using only the phase difference of predetermined reflected light. The player 500 operates on the supposition that there are pits on the optical disc 102 and is designed so as to operate by taking advantage of the phase difference of the reflected light that has been caused by those pits.

The player 500 includes a disc motor 140, an optical pickup 510, an optical disc controller (ODC) 520, and a driving section 530. The optical pickup 510 is equivalent to the optical pickup 122 shown in FIG. 9. The ODC 520 performs the functions of the preamplifier 126, the focus error generator 128, focus control section 130 and microcomputer 132 shown in FIG. 9. The processor 311 of the ODC 520 corresponds to the microcomputer 132. Also, the driving section 530 includes the focus actuator driver 136 shown in FIG. 9 and further includes the transport stage driver 134 although not shown in FIG. 14. The optical pickup 510 is put on a transport stage (not shown), which may be the same as the counterpart 124 shown in FIG. 9.

First, a servo control configuration, which is needed to read data, will be described.

To make the focal point of the light beam follow the desired track on the information storage layer of the optical disc 102 that is being spun at a predetermined velocity by the disc motor 140, TE and FE signals, representing a tracking error and a focus error, respectively, need to be generated based on the light beam that has been reflected from the optical disc 102.

The light beam that has been reflected from the optical disc 102 is transformed by an objective lens 203 into a parallel light beam, which is then incident on a polarization beam splitter 206. At this point in time, the polarization direction of the light beam has rotated 90 degrees from that of the light beam that entered the optical disc 102. Therefore, the light beam is transmitted through the polarization beam splitter 206 and then incident onto a photodetector 208 as it is by way of a condenser lens 207.

The photodetector 208 receives the light that has been transmitted through the condenser lens 207 and converts the light into electrical signals (such as current signals). On its photosensitive plane, the photodetector 208 shown in FIG. 14 has four divided areas A, B, C and D, each of which outputs an electrical signal representing the intensity of the light received.

Preamplifiers 126a, 126b, 126c and 126d convert the current signals, supplied from the photodetector 208, into voltage signals. Adders 344 and 346 calculate the sums of the voltage signals supplied from the preamplifiers 126a, 126b, 126c and 126d diagonally on the photodetector 208. More specifically, the adder 344 may output a sum signal A+D, of which the magnitude corresponds with the sum of the outputs of the areas A and D, while the adder 346 may output a sum signal B+C, of which the magnitude corresponds with the sum of the outputs of the areas B and C, for example. Alternatively, other signals may also be generated if the sums are calculated differently.

Comparators 352 and 354 digitize the output signals of the adders 344 and 346, respectively. A phase comparator 356 compares the phases of the output signals of the comparators 352 and 354 to each other. A differential amplifier 360 receives the output signal of the phase comparator 356 and outputs a phase difference TE signal, which is used to perform a control operation that makes the light beam scan the right track on the optical disc 102.

A gain switcher 366 adjusts the amplitude of the phase difference TE signal to a predetermined value. An A/D (analog-to-digital) converter 370 converts the phase difference TE signal supplied from the gain switcher 366 into a digital signal.

The differential amplifier 358 receives the outputs of the adders 344 and 346 and outputs an FE signal, which is a signal for controlling the optical pickup such that the light beam has a predetermined converging state on the information storage layer of the optical disc 102. The FE signal may be detected by any method—by an astigmatism method, a knife edge method or even a spot sized detection (SSD) method. The circuit configuration may be changed appropriately according to the detection method adopted. A gain switcher 364 adjusts the amplitude of the FE signal to a predetermined value. An A/D converter 368 converts the FE signal supplied from the gain switcher 364 into a digital signal.

An adder 313 adds together the output signals of the adders 344 and 346, thereby generating an all sum signal (A+B+C+D) and sending it to an LPF 123, which filters out high frequency components from the all sum signal to generate an RF sum signal. Then, the RF sum signal is passed to a shaping circuit 324.

The shaping circuit 324 performs binarization and shaping by comparing the amplitude level of the all sum signal to a reference level that has been set in advance by a shaping setting section 362. For example, the shaping circuit 324 may binarize the all sum signal such that an amplitude level of the all sum signal that is lower than the reference level is "High" and that an amplitude level of the all sum signal that is equal to or higher than the reference level is "Low". The amplitude level of the all sum signal decreases when the light beam passes a finger mark or a scratch. For that reason, by setting the reference level to an appropriate level, a finger mark or a scratch can be detected.

The FE signal, TE signal and binarized and shaped signal that have been generated by the circuits described above are input to the processor 311, which includes the focus control section 118, the tracking control section 119, a HOLD filter 320, a defect detecting section 326, a switch 328 and the shaping setting section 362.

The processor 311 outputs control signals FEPWM and TEPWM for the purposes of focus control and tracking control to the respective drivers 136 and 138 of the driving section 530.

In response to the control signal FEPWM, the driver 136 drives the focus actuator 143, which moves the objective lens 203 substantially perpendicularly to the data storage side of the optical disc 102. On the other hand, in response to the control signal TEPWM, the driver 138 drives the tracking actuator 202, which moves the objective lens 203 substantially parallel to the data storage side of the optical disc 102.

In reading data, the driving section 530 drives the optical pickup in response to the signal supplied from the ODC 520. When data that is stored over multiple storage layers needs to be read continuously, the focal point of the light beam should be shifted along the path shown in FIG. 6(b) or 6(c). If the optical disc 102 is a BD with multiple storage layers, the spherical aberration is adjusted using a spherical aberration correction lens and its driving mechanism (neither is shown) in the optical pickup 510 while the focal point is moving between the storage layers. Specifically, when the driving section 530 outputs a drive signal in accordance with the instruction given by the ODC 520, the driving mechanism for the spherical aberration correction lens drives the spherical aberration correction lens in response to the drive signal. As a result, the spherical aberration is adjusted so as to be sufficiently small at the destination storage layer.

The output signal of the shaping circuit 324 is supplied to the defect detecting section 326 of the processor 311. If the signal is High, the defect detecting section 326 turns the switch 128 to the HOLD filter 320 and puts the tracking error signal on hold such that the servo control does not fail due to the presence of a finger mark, for example. On the other hand, if the signal is Low, the defect detecting section 326 turns the switch 128 to the tracking control section 119 and passes the tracking error signal to the tracking control section 119.

Next, the configuration for reading data will be described.

An adder 372 adds together the respective outputs of the areas A, B, C and D of the photodetector 208, thereby generating an all sum signal (A+B+C+D), which is then input to the HPF 373 of the ODC 520. Optionally, the adder 372 may be omitted such that the output of the adder 313 is supplied to the HPF 373.

After having its low-frequency components filtered out by the HPF 373, the sum signal is passed through an equalizer section 374, binarized by the binarizer section 375, subjected to PLL, error correction, demodulation and other types of processing by an ECC/demodulator 376 and then temporarily stored in a buffer 377. The storage capacity of the buffer 377 has been determined with various playback conditions taken into consideration.

The data in the buffer 377 is read out at a presentation time of video, for example, and output to a host computer (not shown) as read data. As a result, video and so on can be played back.

Even a conventional optical disc player also includes a buffer for temporarily storing read data and its storage capacity is also determined with various playback conditions taken into account.

However, the storage capacity of the buffer 377 included in this player 500 may be approximately one-third of that of a conventional player. The reason will be described below with reference to FIG. 15.

FIG. 15(a) shows a condition that determines the storage capacity of a buffer for a conventional player, while FIG. 15(b) shows a condition that determines the storage capacity of the buffer 377 of this preferred embodiment. Each of these drawings shows the time it takes for the focal point to reach the next data storage location since a focus jump operation is started on a dual-layer BD-R. By considering this amount of time, the size of data that needs to be output during the data unreadable interval (i.e., the period of time from the start of the focus jump operation through the completion of the focus jump to the storage location to read data from next) can be determined according to the playback rate.

As shown in FIG. 15(a), the conventional player has to allow a data unreadable interval of approximately 1,000 ms in total, which consists of 20 ms for changing the spherical aberrations, 50 ms for getting the focus jump operation done, another 50 ms for detecting the failure (or error) of the focus jump operation shown in FIG. 2(b), 600 ms for retrying a focus control on the target storage layer to overcome the focus jump failure and establishing a focus controllable state, and 100 ms for turning the tracking control ON and getting a seek operation to a target track done.

Supposing the video and audio playback rates are 24 Mbps, data of 24 megabits (i.e., 3 megabytes) should be stored to continue playback all through the data unreadable interval of 1,000 ms. That is why the buffer capacity needs to be at least 3 megabytes.

On the other hand, as shown in FIG. 15(b), the player 500 of this preferred embodiment should allow a data unreadable interval of approximately 400 ms in total, which consists of 200 ms for changing the spherical aberrations, 50 ms for getting the focus jump operation done, another 50 ms for detecting the error, and 100 ms for turning the tracking control ON and getting the seek operation to the target track done.

Thus, supposing the playback rates are 24 Mbps, data of 9.6 megabits (i.e., 1.2 megabytes) should be stored to continue playback. That is why the buffer capacity needs to be at least 1.2 megabytes, which is approximately one-third of the example described above. Therefore, it can be said that the required buffer capacity has been cut down significantly.

As shown in FIG. 6(d), in the player 500, the focal point never enters the unrecorded area to make the servo control fail during a focus jump operation. That is why unlike the conventional player, there is no need to take into account 600 ms for retrying the focus control to overcome the focus jump failure. As a result, it is no longer necessary to get a size of data corresponding to that period of time, thus cutting down the required buffer capacity.

Even a recorder with recording function can also achieve this effect of cutting down the buffer capacity. The recorder can perform a tracking control not just by the phase difference method but also by the push-pull method, and therefore, should achieve good stability in tracking control. However, if the focus shifting control of the present invention is combined with the tracking control by the phase difference method, the stability and accuracy of the control can be further increased.

FIG. 16 shows an exemplary hardware configuration for an optical disc recorder 600 according to this preferred embodiment.

The recorder 600 can write data on the optical disc 102 such as a BD-R and can also read data from such an optical disc 102. In reading data using the phase difference TE signal, the recorder 600 makes the driving section 530 drive the optical pickup 610 and its internal components in response to the signal from the ODC 620. When data that is stored over multiple storage layers needs to be read continuously, the focal point of the light beam shifts along the path shown in FIG. 6(b) or 6(c).

The recorder 600 includes the disc motor 140, an optical pickup 610, an optical disc controller (ODC) 620 and a driving section 630. Each of these components corresponds to the counterpart of the player 500 that is called by the same name.

In the optical pickup 610, ODC 620 and driving section 630, any component having the same function as the counterpart of the player 500 is identified by the same reference numeral and the description thereof will be omitted herein. The ODC 620 also includes a buffer 377, of which the capacity may also be a reduced one just like the player 500 described above.

Next, it will be described how the ODC 620 generates a push-pull TE signal. An adder 408 outputs a sum signal of the areas B and D of the photodetector 208, while an adder 414 outputs a sum signal of the areas A and C of the photodetector 208. A differential amplifier 410 receives the outputs of these two adders 408 and 414 and outputs a push-pull TE signal representing their difference. A gain switcher 416 adjusts the amplitude of the push-pull TE signal to a predetermined one (gain). An A/D converter 420 converts the output signal of the gain switcher 416 into a digital signal and passes it to a DSP 412, which has the same configuration as the processor 311 shown in FIG. 14.

In reading continuously video, audio and other data that is stored over at least two storage layers, the optical disc drive 100 of the preferred embodiment described above and the player 500 and recorder 600, which are specific embodiments of the optical disc drive 100, shift the focal point of the light beam intentionally inward or outward by a predetermined displacement either before the focal point is moved to another storage layer or while the focal point is being moved to that storage layer. As a result, it is possible to prevent the focal point from entering the unrecorded area and seamless playback is also realized even if the data is stored over multiple storage layers.

Embodiment 2

An optical disc drive according to a second preferred embodiment of the present invention is always ready to determine, based on a variation in reflectance before and after the focus jump and an address read error generated, whether or not the focal point has entered the unrecorded area. And as soon as the focal point has entered the unrecorded area, the optical disc drive drives the optical pickup away from the unrecorded area in the opposite radial direction, thereby making the optical pickup go back to the recorded area. By performing this operation, the focus jump is realized with even more stability.

For example, if in the example shown in FIG. 5(a) that has already been referred to in the description of the first preferred embodiment, the radial width of the recorded area 52a in the L1 layer were smaller than the intentional radial displacement D or if the bonding error between the storage layers were greater than expected, the focal point could still enter the unrecorded area even with the optical disc drive of the first preferred embodiment. However, the optical disc drive of this second preferred embodiment can quickly correct the focus position even if the focal point has entered the unrecorded area that way. This operation can be done within about 50 ms, which is much shorter than the amount of time it would take for a conventional drive to get a retried focus control done (e.g., 600 ms in the example shown in FIG. 15(*a*)).

FIG. 17 schematically shows the arrangement of functional blocks in an optical disc drive 200 according to a second preferred embodiment of the present invention. The optical disc drive 200 includes the converging section 110, the horizontal location changing section 112, the vertical position changing section 114, the focus detecting section 116, the focus control section 118, the layer change control section 120, a light beam spot shifting control section 202, a rotating section 204 and an unrecorded area detecting section 301. In FIG. 17, any component having substantially the same function as the counterpart of the optical disc drive 100 of the first preferred embodiment described above is identified by the same reference numeral as that used in FIG. 8 and the description thereof will be omitted herein. The rotating section 204 has the same function as the disc motor 140.

The light beam spot shifting control section 202 (which will be simply referred to herein as a "spot shifting control section 202") has the same configuration, and operates the same way, as the spot shifting control section 104 of the first preferred embodiment. In addition, the light beam spot shifting control section 202 also changes the types of processing according to the state of an unrecorded area detection signal supplied from the unrecorded area detecting section 301.

FIG. 18 shows an exemplary hardware configuration for the optical disc drive 100 shown in FIG. 17. The optical disc drive 200 includes the disc motor 140, the optical pickup 122, the preamplifier 126, the focus actuator driver 136, the transport stage 124, the transport stage driver 134, the focus error generator 128, the focus control section 130, a microcomputer 210 and the unrecorded area detecting section 301. In FIG. 18, any component having substantially the same function as the counterpart of the optical disc drive 100 of the first preferred embodiment described above is identified by the same reference numeral as that used in FIG. 9 and the description thereof will be omitted herein.

The microcomputer 210 has the same configuration, and operates the same way, as the microcomputer 132 of the first preferred embodiment described above. However, unlike the microcomputer 132, the microcomputer 210 detects the signal of the unrecorded area detecting section 301 as the additional component and gets the transport stage 124 controlled by the transport stage driver 134. The detailed configuration of the unrecorded area detecting section 301 will be described later with reference to FIG. 20.

Hereinafter, it will be described with reference to FIG. 19 how the optical disc drive 200 of this preferred embodiment operates. FIG. 19 is a flowchart showing a focus shifting control procedure to be performed in a situation where the focus needs to be jumped from one storage layer to another. In FIG. 19, the same processing step as that shown in FIG. 11 is identified by the same reference numeral and the description thereof will be omitted herein.

The focus shifting control shown in FIG. 19 is performed when the light beam spot needs to be not only moved from one storage layer to another but also shifted inward or outward on the optical disc.

In this light beam spot shifting control procedure, the spot shifting control section 202 performs a focus jump operation in Step S104 and then the unrecorded area detecting section 301 determines in Step S200 whether the current location of the focus jumped is within the recorded area or the unrecorded area. If the focus jumped is located within the recorded area, the tracking control is turned ON to look for a predetermined address and read data from the predetermined location in Step S108. As a result, data can be read continuously.

On the other hand, if the focus jumped is located within the unrecorded area, the microcomputer 210 instructs the transport stage driver 134 to drive the transport stage 124 inward (or outward) intentionally in Steps S100, S102 and S106 and makes the unrecorded area detecting section 301 see if the focal point has come back to the recorded area. If the focal point has certainly come back to the recorded area, the tracking control is turned ON to look for a predetermined address and read data from the predetermined location in Step S108. As a result, data can be read continuously.

Next, the hardware configuration of the unrecorded area detecting section 301 will be described with reference to FIG. 20, which shows an exemplary hardware configuration for the unrecorded area detecting section 301 that includes an adder 302 and a comparator 303.

The adder 302 receives light intensity signals from the preamplifier 126 and outputs an all sum signal AS thereof. The preamplifier 126 corresponds to the preamplifiers 126*a*, 126*b*, 126*c* and 126*d* of the optical pickup 510 shown in FIG. 14, for example. The comparator 303 compares the level of the all sum signal AS to a reference level. If the level of the all sum signal AS is greater than the reference level, the comparator 303 outputs one. On the other hand, if the former level is smaller than the latter, the comparator 303 outputs zero.

The reference level is set by the microcomputer 210. Since the recorded and unrecorded areas have different reflectances, the reference level may be an intermediate value (e.g., an average) between the reflectances of the recorded and unrecorded areas.

In reading data from an optical disc with a "HIGH to LOW" property in which the reflectance of the unrecorded area is higher than that of the recorded area, if the comparator 303 outputs one, then the microcomputer 210 determines that the focal point has entered the unrecorded area.

On the other hand, in reading data from an optical disc with a "LOW to HIGH" property in which the reflectance of the unrecorded area is lower than that of the recorded area, if the comparator 303 outputs zero, then the microcomputer 210 determines that the focal point has entered the unrecorded area.

Optionally, by using the difference in reflectance between the unrecorded and recorded areas, it may be determined, based on the reflectance detected, whether the focal point is now located in the recorded area or in the unrecorded area. If it has been determined that the focal point is now within the unrecorded area, the focal point may always be shifted intentionally either inward or outward by less than the displacement D (e.g., D/2). The direction of shift is the radial direction leading to the unrecorded area caused by a bonding error, for example. In other words, the direction of shift is opposite to the direction in which the spiral track is wound on the destination storage layer of the focus jump operation.

In this example, it is determined, based on the difference in reflectance, whether or not the focal point is located within the unrecorded area. Alternatively, this decision can also be made by determining whether or not the address can be read from the optical disc.

In that case, the microcomputer 210 functions as an address detecting section for detecting addresses on the tracks of the respective storage layers.

After the focus jump has been done, the microcomputer 210 turns the tracking control ON quickly, thereby attempting to read the track address. If the address has been read successfully, then the microcomputer 210 determines that the location is within the recorded area.

If the address cannot be read, address reading is retried a predetermined number of times (e.g., three times). However, if the address is still unreadable even after the predetermined number of times of retries, the microcomputer 210 alerts an address read error and determines that the focal point has entered the unrecorded area. Then, the microcomputer 210 intentionally displaces the optical head inward or outward to perform error recovery processing. The direction and the magnitude of the displacement are the same as those of the example that uses the reflectance.

These operations can also be performed by the processor of the player 500 and the recorder 600 that has already been described for the first preferred embodiment.

In reading continuously video, audio and other data that is stored over at least two storage layers, the optical disc drive 200 of the preferred embodiment described above moves the focal point of the light beam to a location on another storage layer and then determines whether or not the location is within the unrecorded area. If the answer is YES, the optical disc drive shifts the focal point of the light beam intentionally toward the recorded area that is either inside or the outside of that location. That is why even if the focal point has once entered the unrecorded area, the focal point can quickly go back to the recorded area, and therefore, the data that is stored over multiple storage layers can be read just as intended. As a result, a content such as video or audio can be played back seamlessly.

In the preferred embodiment described above, if it has been determined that the focal point has entered the unrecorded area, the focal point is supposed to be shifted intentionally toward the recorded area that is located either inside or outside of that location. In this case, the magnitude of the shift may be equal to or smaller than the magnitude D of the inward or outward shift (e.g., D/2).

Optionally, any of the focus shifting control procedures shown in FIGS. 11 through 13 and FIG. 19 may be implemented as a computer program processing procedure. The computer program is stored in the memory (not shown) of the optical disc drive and is executed by the microcomputer. Alternatively, a digital signal processor (DSP) may also be used instead of the microcomputer. The computer program may be circulated on the market by being stored on a storage medium such as a CD-ROM or transmitted over telecommunications lines such as the Internet. By executing such a computer program, even a conventional optical disc drive can also perform the same focus shifting control as that performed by the optical disc drive of the present invention.

INDUSTRIAL APPLICABILITY

When data should be read from a particular storage layer of a multilayer disc, on which information is stored over multiple storage layers, and from another layer continuously, the optical disc drive of the present invention shifts the light beam spot in a radial direction that is opposite to the radial direction in which the light beam spot has moved on the previous storage layer, thereby preventing the light beam spot from entering the unrecorded area. Even if the light beam spot has once entered the unrecorded area, the servo controllable state can be recovered quickly and just as intended. As a result, a content such as a video or audio can be played back seamlessly.

Also, even if the given optical disc has not been subjected to finalize processing yet, the optical disc drive of the present invention can also shift the focal point to its recorded area just as intended. That is why there is no need for the user to subject an optical disc with a huge storage capacity (such as a BD) to finalize processing that would take a lot of time to get done. Furthermore, unlike the conventional optical disc drive, the optical disc drive of the present invention never performs retries a number of times and alerts a read error as a result of time out.

Also, even if the focal point has once entered the unrecorded area, the optical disc drive of the second preferred embodiment described above, in particular, can shift the focal point back to the recorded area quickly and just as intended. As a result, data never becomes unreadable and the content on the optical disc can be viewed and listened to with no problems, thus providing a highly reliable optical disc drive that can be used by users comfortably.

The invention claimed is:

1. An optical disc drive having the ability to read data from an optical disc that has a plurality of storage layers including a first storage layer and a second storage layer, the drive comprising:
    a drive mechanism for rotating the optical disc;
    an optical pickup, which irradiates the optical disc, loaded in the drive mechanism, with converged light and generates a read signal based on the light that has been reflected from the optical disc; and
    a control section for controlling operations of the drive mechanism and the optical pickup, thereby shifting the focal point of the light,
    wherein in reading continuously data that is stored over the first and second storage layers, the control section shifts the focal point of the light in a first radial direction while data is being read from the first storage layer and then moves the focal point of the light to a location on the second storage layer before data starts to be read from the second storage layer, the location on the second storage layer having been shifted from its previous location by a predetermined displacement in a second radial direction that is opposite to the first radial direction.

2. The optical disc drive of claim 1, wherein before data starts to be read from the second storage layer, the control section shifts the focal point of the light on the first storage layer in the second radial direction by the predetermined displacement and then jumps the focal point to the second storage layer.

3. The optical disc drive of claim 1, wherein before data starts to be read from the second storage layer, the control section jumps the focal point of the light from the first storage layer to the second storage layer while shifting the focal point in the second radial direction.

4. The optical disc drive of claim 1, wherein before data starts to be read from the second storage layer, the control section jumps the focal point of the light from the first storage layer to the second storage layer and then shifts the focal point in the second radial direction by the predetermined displacement.

5. The optical disc drive of claim 4, further comprising a decision section for determining, based on the light that has been reflected from the optical disc, whether the focal point of the light is currently located in a recorded area where data is stored or in an unrecorded area where no data is stored,
    wherein if the decision section determines that the focal point of the light that has been jumped from the first storage layer to the second storage layer is currently located in the unrecorded area, the control section shifts the focal point of the light in the second radial direction by the predetermined displacement.

6. The optical disc drive of claim 4, further comprising an address detecting section for detecting addresses on respective tracks of the first and second storage layers based on the light that has been reflected from the optical disc,
    wherein if the address detecting section is unable to detect the address after the focal point of the light has been jumped from the first storage layer to the second storage layer, the control section shifts the focal point of the light in the second radial direction by the predetermined displacement.

7. The optical disc drive of claim 1, wherein respective spiral tracks on the first and second storage layers are wound in mutually opposite directions.

8. The optical disc drive of claim 1, wherein the data is read from respective recorded areas of the first and second storage layers, to which continuous logical sector numbers have been given.

9. The optical disc drive of claim 1, wherein the optical disc drive is a read-only device for reading the data that has been written by a recorder.

10. A controller to be built in an optical disc drive, the drive comprising:
    a drive mechanism for rotating an optical disc and
    an optical pickup, which irradiates the optical disc, loaded in the drive mechanism, with converged light and generates a read signal based on the light that has been reflected from the optical disc,
    the drive having the ability to read data from the optical disc that has a plurality of storage layers including a first storage layer and a second storage layer,
    wherein in reading continuously data that is stored over the first and second storage layers, the controller controls operations of the drive mechanism and the optical pickup and shifts the focal point of the light in a first radial direction while data is being read from the first storage layer and then moves the focal point of the light to a location on the second storage layer before data starts to be read from the second storage layer, the location on the second storage layer having been shifted from its previous location by a predetermined displacement in a second radial direction that is opposite to the first radial direction.

11. The controller of claim 10, wherein before data starts to be read from the second storage layer, the controller shifts the focal point of the light on the first storage layer in the second radial direction by the predetermined displacement and then jumps the focal point to the second storage layer.

12. The controller of claim 10, wherein before data starts to be read from the second storage layer, the controller jumps the focal point of the light from the first storage layer to the second storage layer while shifting the focal point in the second radial direction.

* * * * *